(12) United States Patent
Lee et al.

(10) Patent No.: US 9,323,084 B2
(45) Date of Patent: Apr. 26, 2016

(54) CURVED LIQUID CRYSTAL DISPLAY DEVICE

(71) Applicant: LG DISPLAY CO., LTD., Seoul (KR)

(72) Inventors: Se-Min Lee, Goyang-si (KR);
Hyun-Woo Jang, Goyang-si (KR);
Ji-Eun Son, Paju-si (KR); JooYoung Yeon, Paju-si (KR); Jae-Yeon Song, Incheon (KR); Yong-Joong Yoon, Paju-si (KR); Hyo-Sung Lee, Jecheon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 167 days.

(21) Appl. No.: 14/019,256

(22) Filed: Sep. 5, 2013

(65) Prior Publication Data

US 2014/0168564 A1   Jun. 19, 2014

(30) Foreign Application Priority Data

Nov. 8, 2012 (KR) .................. 10-2012-0126336
Nov. 16, 2012 (KR) .................. 10-2012-0130240

(51) Int. Cl.
*G02F 1/133* (2006.01)
*G02F 1/1333* (2006.01)
*F21V 8/00* (2006.01)
*G02F 1/1335* (2006.01)

(52) U.S. Cl.
CPC ........ *G02F 1/133308* (2013.01); *G02B 6/0093* (2013.01); *G02F 1/133615* (2013.01); *G02F 2001/133314* (2013.01); *G02F 2001/133325* (2013.01)

(58) Field of Classification Search
CPC ........ G02F 2001/133328; G02F 2001/133314; G02F 1/133305; G02F 1/133308; G02F 2001/133322; G02F 2001/133325; G02F 1/133608; G02B 6/0093
See application file for complete search history.

(56) References Cited

U.S. PATENT DOCUMENTS

| 6,175,396 B1 * | 1/2001 | Kim et al. .................. 349/58 |
| 6,552,761 B1 * | 4/2003 | Seo et al. .................. 349/58 |
| 7,667,786 B2 | 2/2010 | Nouchi et al. |
| 7,826,006 B2 | 11/2010 | Koganezawa |

(Continued)

FOREIGN PATENT DOCUMENTS

| CN | 1461965 A | 12/2003 |
| CN | 101680618 A | 3/2010 |

(Continued)

OTHER PUBLICATIONS

Office Action issued in corresponding Korean Patent Application No. 10-2012-0126336, mailed Nov. 4, 2013, 3 pages.

(Continued)

*Primary Examiner* — Jessica M Merlin
(74) *Attorney, Agent, or Firm* — Brinks Gilson & Lione

(57) ABSTRACT

A curved liquid crystal display device includes a liquid crystal display panel, a backlight unit, a bottom cover and a reinforcement frame. The liquid crystal display panel includes a thin film transistor substrate and a color filter substrate. The backlight unit applies light to the liquid crystal display panel. The bottom cover supports the backlight unit and has a flat shape. The reinforcement frame has a predetermined curvature and is attached to the bottom cover. The flat bottom cover is mounted on the reinforcement frame such that the flat bottom cover has the predetermined curvature of the reinforcement frame.

19 Claims, 31 Drawing Sheets

(56) References Cited

U.S. PATENT DOCUMENTS

| | | | |
|---|---|---|---|
| 8,106,407 B2 | 1/2012 | Yamazaki et al. | |
| 8,111,347 B2 | 2/2012 | Koganezawa | |
| 2001/0050732 A1* | 12/2001 | Okamoto et al. | 349/58 |
| 2009/0096965 A1* | 4/2009 | Nagata | 349/103 |
| 2009/0225255 A1* | 9/2009 | Hsiao | 349/58 |
| 2011/0007235 A1 | 1/2011 | Chang | |
| 2011/0013420 A1 | 1/2011 | Coleman et al. | |
| 2011/0096262 A1 | 4/2011 | Kikuchi | |
| 2011/0102721 A1 | 5/2011 | Enomoto | |
| 2011/0255039 A1 | 10/2011 | Enomoto | |
| 2014/0125913 A1* | 5/2014 | Lee et al. | 349/58 |

FOREIGN PATENT DOCUMENTS

| | | |
|---|---|---|
| CN | 102364384 A | 2/2012 |
| JP | 2002-049021 | 2/2002 |
| JP | 2009-020168 | 1/2009 |
| KR | 1020110025493 A | 3/2011 |
| KR | 1020110042574 A | 4/2011 |
| KR | 1020110077272 A | 7/2011 |
| KR | 1020110107980 A | 10/2011 |
| KR | 1020110118389 A | 10/2011 |
| KR | 1020120029090 A | 3/2012 |
| TW | 200931109 A | 7/2009 |
| TW | I514036 | 12/2015 |

OTHER PUBLICATIONS

Extended European Search Report issued in corresponding European Patent Application No. 13185779.9, mailed Feb. 28, 2014, 10 pages.
Notice of Allowance issued in Korean Patent Application No. 10-2012-0126336, mailed May 21, 2014, 6 pages.
Notice of Allowance issued in Korean Patent Application No. 10-2012-0130240, mailed Jun. 23, 2014, 6 pages.
Office Action dated Nov. 18, 2015 for corresponding Chinese Patent Application No. 201310467704.5, 7 pages.

* cited by examiner

Main Viewing Area
For Flat LCD Device

Main Viewing Area
For Curved LCD Device

Mounting a flat bottom cover on a curved reinforcement frame

Preparing a curved bottom cover as a result of attachment to the curved reinforcement frame Fig. 7A(1)
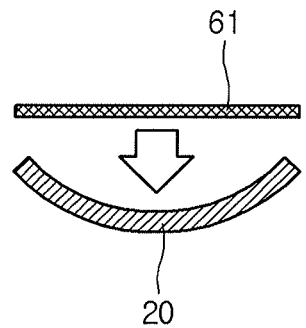
Fig. 7A(2)
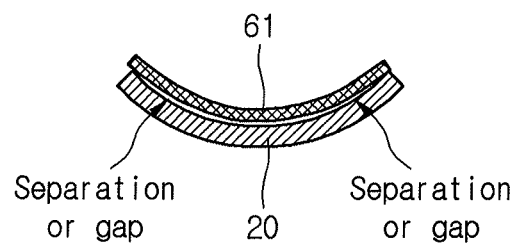
Fig. 7B(1)
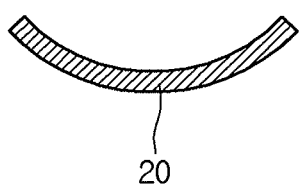

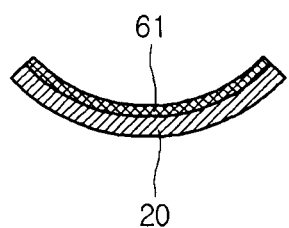
Fig. 7B(2)
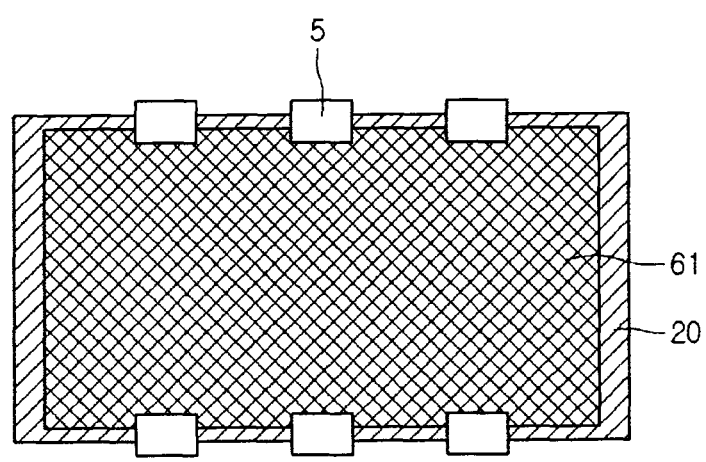
Fig. 7C

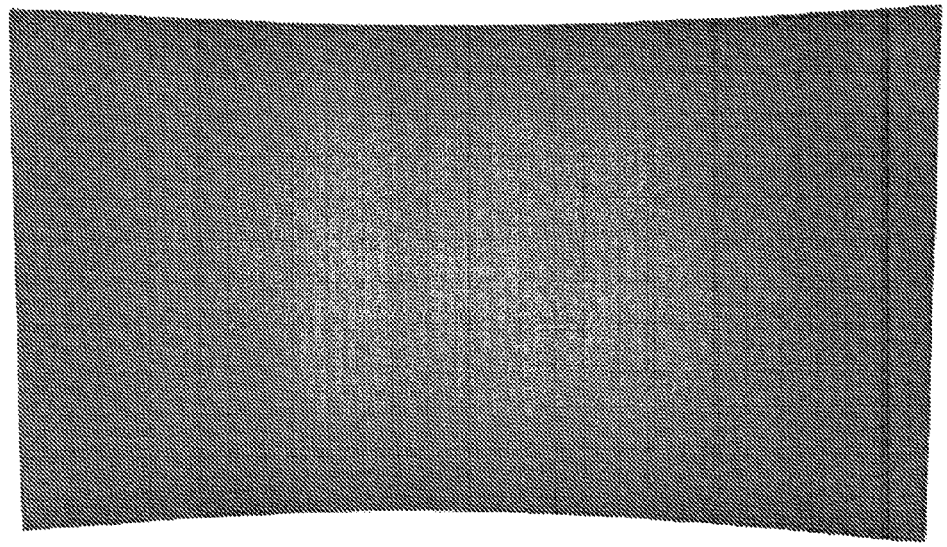
Fig. 9A
Fig. 9B
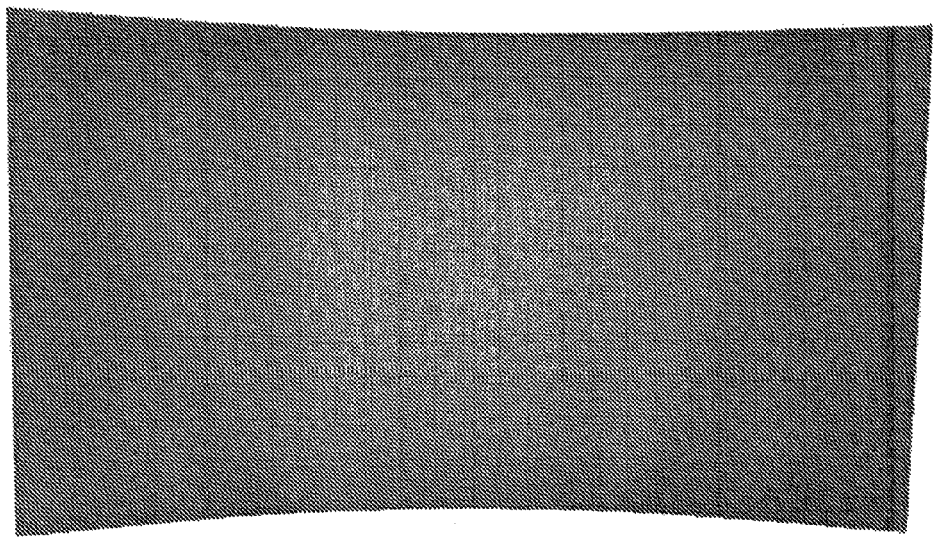

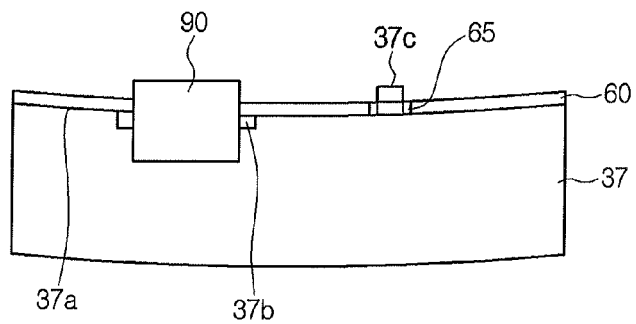

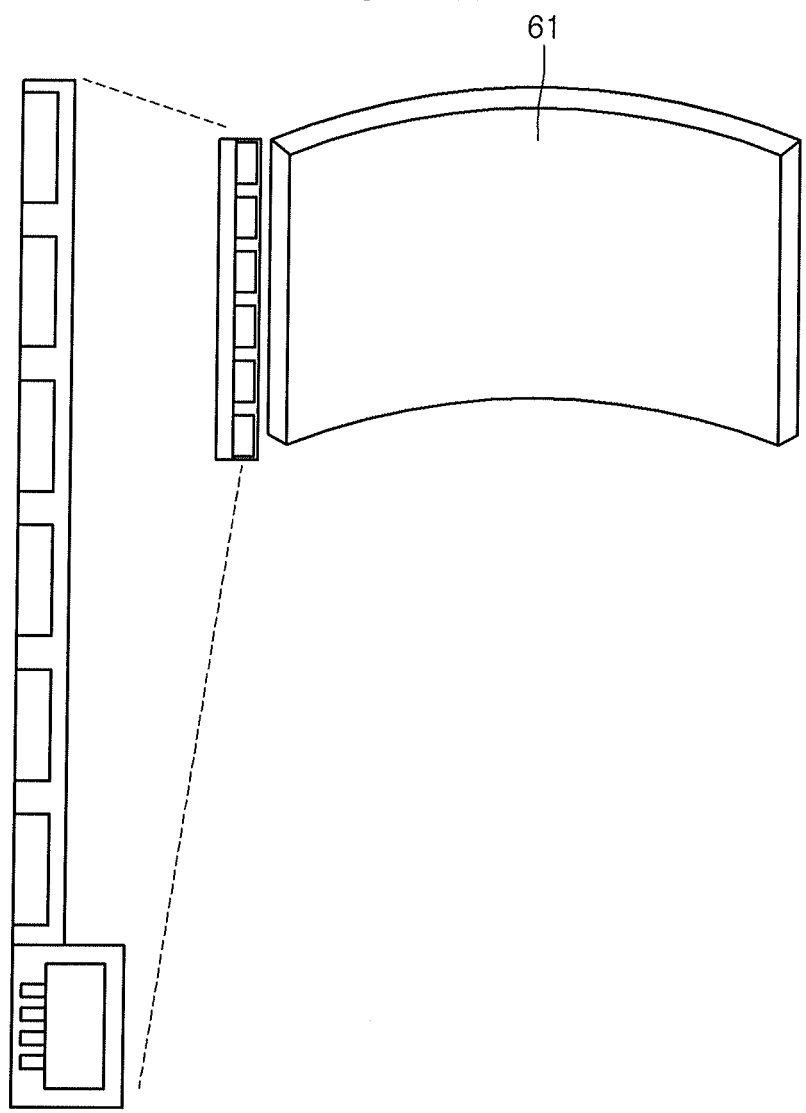
Fig. 12B(1)

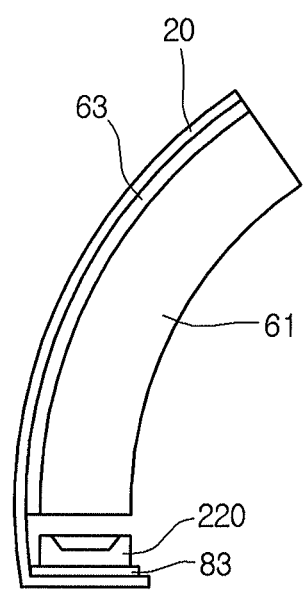
Fig. 12B(2)

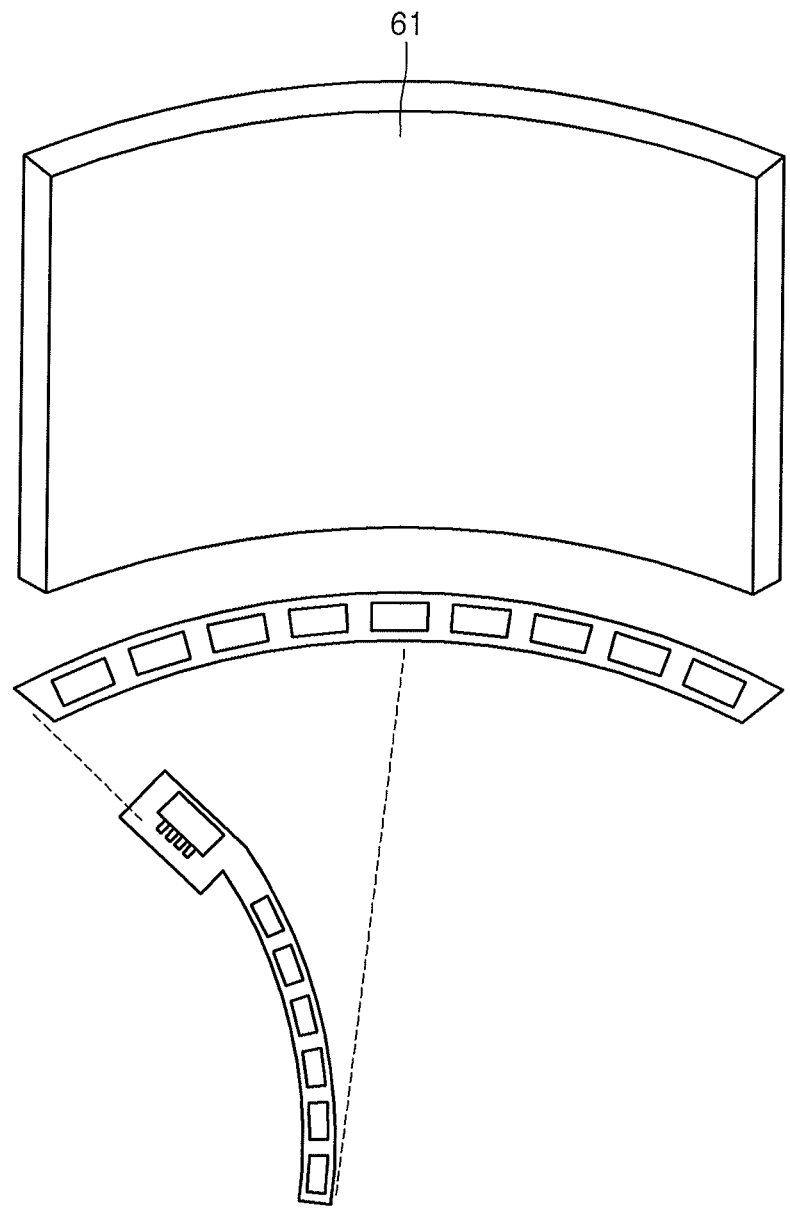
Fig. 12C(1)

Fig. 12C(2)
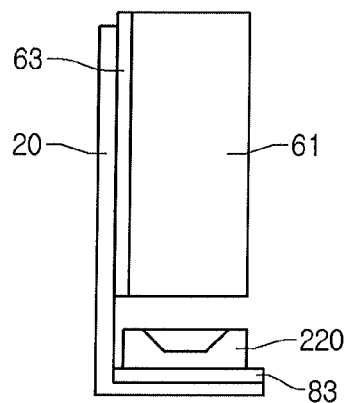
Fig. 13
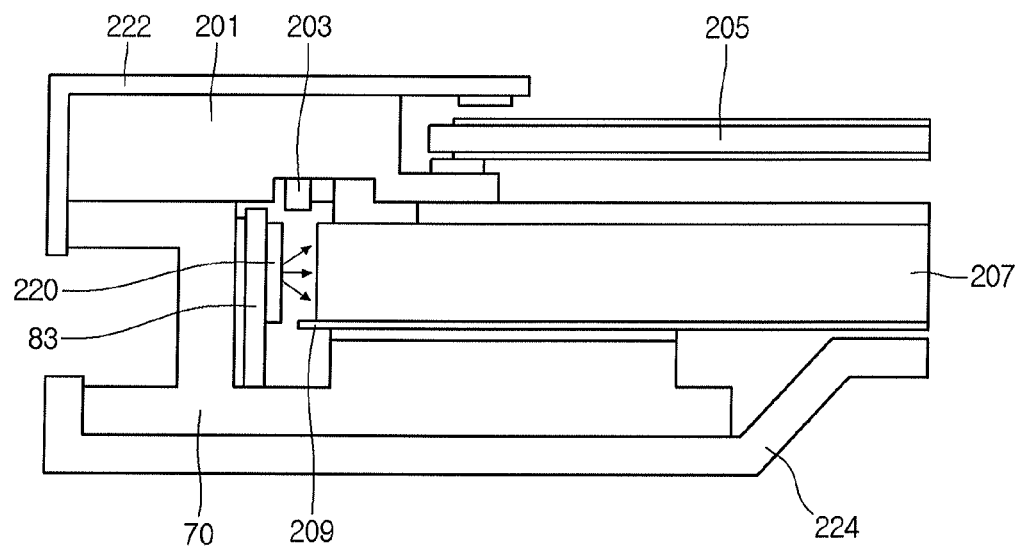

Forming Configuration

Fig. 27B(1)
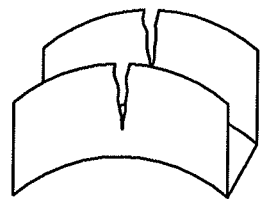
Fig. 27B(2)
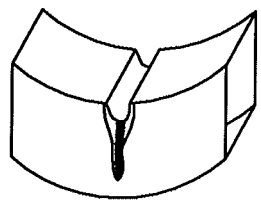
Fig. 27B(3)
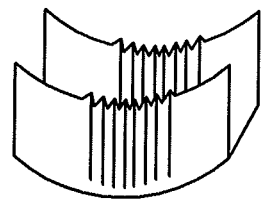
Fig. 27B(4)
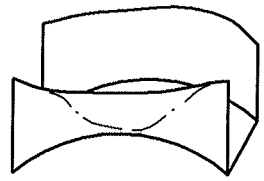

CURVED LIQUID CRYSTAL DISPLAY DEVICE

PRIORITY AND CROSS-REFERENCE TO RELATED APPLICATIONS

The present application claims priority under 35 U.S.C. §119(a) of Korean Patent Application Nos. 10-2012-0126336, filed on Nov. 8, 2012 and 10-2012-0130240 filed on Nov. 16, 2012, disclosures of which are hereby incorporated by reference in their entirety. The present application also relates to U.S. application entitled Curved Liquid Crystal Display Device Having A Backlight Assembly and filed on the same date.

BACKGROUND

1. Field of the Disclosure

The present application relates to a curved liquid crystal display device and more particularly a roundly curved liquid crystal display device having a curved support frame. The present application also relates to a securing mechanism for securing a light guide plate on the curved support frame in connection with a curved liquid crystal display device. The present application further relates to an arrangement mechanism for arranging an optical sheet on the curved support frame and the light guide plate in connection with a curved liquid crystal display device. The present application further relates to light source structures and arrangement mechanism for arranging the light source structures in the curved liquid crystal display device.

2. Description of the Related Art

Nowadays, a variety of display devices for displaying information are being developed. Display devices include cathode ray tubes (CTRs), liquid crystal display (LCD) devices, plasma display panel devices, organic light emitting display (OLED) device, electroluminescent display devices and so on. Among these display devices, LCD devices can be made lighter and thinner than cathode ray tubes. Also, LCD devices have a feature of lower power consumption than CRTs.

LCD devices are not self-illuminating display devices, unlike the OLED devices and so on. As such, LCD devices need a backlight unit used as a rear light source.

LCD devices are manufactured in a flat board shape. FIG. 1 illustrates a flat LCD device with respect to a main viewing position. As shown in FIG. 1, distances of a central region and both edge regions of the flat LCD device with respect to the main viewing position are different. On the other hand, FIG. 1 illustrates a curved LCD device which has the same distance from the central region and the edge regions of the curved LCD device.

Recently, a narrow bezel, which allows a screen to be largely seen to eyes of a consumer by narrowing edges of the LCD device, is in demand. In order to meet such demand, a light source substrate is being disposed in the upper or lower edge of the backlight unit instead of the left or right edge.

However, each of left and right edge surfaces of a backlight unit, which is used in a curved LCD device for increasing sense of involvement, has a planar shape, but the upper and lower edge surfaces of the backlight unit must have a curved shape. Accordingly, a planar light source substrate may not be compatible with the upper or lower edge of the backlight unit.

BRIEF SUMMARY

Accordingly, embodiments of the present application are directed to a curved LCD device that substantially obviates one or more of problems due to the limitations and disadvantages of the related art.

One embodiment of a curved liquid crystal display device includes a liquid crystal display panel including a thin film transistor substrate and a color filter substrate, a backlight unit, a bottom cover and a reinforcement frame. The backlight unit applies light to the liquid crystal display panel. The bottom cover supports the backlight unit and has a flat shape. The reinforcement frame has a predetermined curvature and is attached to the bottom cover. The flat bottom cover is mounted on the reinforcement frame such that the flat bottom cover has the predetermined curvature of the reinforcement frame.

In one embodiment, a top case protects edges of a front surface of the liquid crystal display panel and that has the same curvature as the reinforcement frame. In one embodiment, the reinforcement frame includes a plurality of horizontal reinforcement bars having the fixed curvature; a plurality of vertical reinforcement bars attached to the plurality of horizontal reinforcement bars in such a manner as to cross the horizontal reinforcement bars and each formed in a straight line shape; and edge reinforcement bars disposed on outer side surfaces of the outermost horizontal reinforcement bars. In another embodiment, the vertical reinforcement bar includes a main body portion and recessed portions formed in regions where the vertical reinforcement bar crosses the horizontal reinforcement bars.

In one embodiment, the horizontal reinforcement bars are received in the recessed portions and fastened to the vertical reinforcement bars. In one embodiment, the backlight unit includes a light source configured to emit light, a light guide plate disposed adjacent the light source and configured to convert light from the light source into two-dimensional light, an optical sheet disposed on an upper surface of the light guide plate and configured to scatter and converge light from the light guide plate, and a housing configured to protect the light source. In this embodiment, the light guide plate, the optical sheet and the housing are fastened to the reinforcement frame.

In one embodiment, the edge reinforcement bar includes a side wall with a top edge, a plurality of side protrusions protruding upwardly from the top edge of the side wall; and a plurality of side concaves recessed from the top edge of the side wall. In one embodiment, the optical sheet includes a plurality of edge tabs protruding outwardly from edges of the optical sheet and attached to the plurality of side protrusions of the edge reinforcement bar.

In another embodiment, a plurality of engagement member is disposed in the side concaves of the edge reinforcement bar and fastening the light guide plate to the bottom cover. In one embodiment, a plurality of cover protrusions protrude upwardly from an upper surface of the bottom cover, and the engagement members are attached to the cover protrusions. In one embodiment, an engagement member is formed in an L shape. In another embodiment, the bottom cover includes a body portion, wings expending outwardly from both side edges of the body portion, the wings and the body portion being formed at different elevations to define a step therebetween; and receiving grooves formed in the wings to expose ends of the horizontal reinforcement bars. In one embodiment, a lower surface of the housing is formed opposite to the wing and the horizontal reinforcement bar and fastened to the bottom cover and the reinforcement frame.

One embodiment of an assembly method of a curved liquid crystal display device includes (i) providing a curved reinforcement frame, the reinforcement frame comprising a plurality of horizontal reinforcement bars having a predetermined curvature and a plurality of vertical reinforcement bars, (ii) mounting and securing a flat bottom cover on the curved reinforcement frame such that the flat bottom cover is configured to be curved with the reinforcement frame, (iii) securing a light guide plate on the bottom cover configured to be curved with the reinforcement frame with an engagement member such that the light guide plate is configured to be curved with the bottom cover and the reinforcement frame; (iv) mounting an optical sheet on the light guide plate configured to be curved with the bottom cover and the reinforcement frame on an edge of the reinforcement frame and (v) mounting a liquid crystal panel on the optical sheet.

In one embodiment, the assembly method further includes mounting a curved top cover on the liquid crystal panel. In another embodiment, the assembly method further includes mounting a backlight vertically along at least one of left or right side of the liquid crystal panel. In one embodiment, the assembly method further includes mounting a backlight horizontally along at least one of upper or lower side of the liquid crystal panel. In one embodiment, the assembly method further includes providing the curved reinforcement frame comprises placing a horizontal reinforcement bar in a recess formed in a vertical reinforcement bar such that the horizontal reinforcement bar crosses the vertical reinforcement bar. In one embodiment, the assembly method further includes securing the light guide plate comprises placing the engagement member horizontally along at least one of upper or lower side of the liquid crystal panel to secure light path between the backlight and the light guide plate. In one embodiment, mounting the optical sheet includes mounting the optical sheet between neighboring engagement members on the edge of the reinforcement frame.

One embodiment of a curved liquid crystal display device includes a liquid crystal panel, a backlight unit, and a reinforcement frame. The backlight unit includes a bottom cover, a light guide plate disposed on the bottom cover, an optical sheet disposed on the light guide plate and a light source substrate arranged along a vertical side of the liquid crystal panel to provide light into the light guide plate. The reinforcement frame is attached to the bottom cover and has a predetermined curvature. The bottom cover is disposed on the reinforcement frame and has the predetermined curvature of the reinforcement frame.

In one embodiment, the light source substrate is flat and extends along the vertical side of the liquid crystal panel. In one embodiment, the light guide plate is flat and secured on the bottom cover with an engagement member. In one embodiment, the engagement member is arranged in a space between the light source substrate and the light guide plate.

Another embodiment of a curved liquid crystal display device includes a liquid crystal panel, a backlight unit, and a reinforcement frame. The backlight unit includes a bottom cover, a light guide plate disposed on the bottom cover, an optical sheet disposed on the light guide plate and a light source substrate arranged along a horizontal side of the liquid crystal panel. The reinforcement frame is attached to the bottom cover and has a predetermined curvature. The reinforcement frame extends along the horizontal side of the liquid crystal panel and includes a side wall extending perpendicular to the horizontal side of the liquid crystal panel toward the liquid crystal panel. The light source substrate is arranged on at least one side wall of the reinforcement frame.

In one embodiment, the light source substrate is curved and the side wall of the reinforcement frame is curved, the light source substrate extending along the curved side wall of the reinforcement frame. In one embodiment, the reinforcement frame includes: a plurality of horizontal reinforcement bars having the predetermined curvature; a plurality of vertical reinforcement bars attached to the plurality of horizontal reinforcement bars in such a manner as to cross the horizontal reinforcement bars; and wherein the side wall is disposed on an outer side surface of an outermost horizontal reinforcement bar. In one embodiment, the side wall and the outer surface of the outermost horizontal reinforcement bar are extended in a curved manner.

In one embodiment, a housing for the light source substrate includes (i) a bottom portion formed to have a curvature corresponding to the outermost horizontal reinforcement bars and disposed on at least one of the outermost horizontal reinforcement bars, and (ii) a side wall portion configured to extend from an edge of the bottom portion and disposed on at least one of the side wall of the reinforcement frame, the side wall portion being bendable and curved. In this embodiment, the light source substrate is disposed on the side wall portion of the housing.

In one embodiment, a securing member secures the light source substrate on the side wall of the reinforcement frame. In this embodiment, the reinforcement frame comprises a plurality of horizontal reinforcement bars having the predetermined curvature, and the plurality of light source arrays is disposed on the side wall of the reinforcement frame and the base extends on an outer side surface of an outermost horizontal reinforcement bar.

One embodiment of an assembly method of a curved liquid crystal device includes (i) providing a curved reinforcement frame, (ii) mounting and securing a flat bottom cover on the curved reinforcement frame such that the flat bottom cover is configured to be curved with the reinforcement frame, (iii) securing a light guide plate on the bottom cover configured to be curved with the reinforcement frame such that the light guide plate is configured to be curved with the bottom cover and the reinforcement frame, (iv) mounting a liquid crystal panel on the optical sheet; and (v) mounting a light source substrate either along a vertical side of the liquid crystal panel, or a horizontal side of the liquid crystal panel, such that a light emitting surface of each light emitting diode is arranged in parallel to a light receiving surface of the light guide plate.

In one embodiment, the reinforcement frame further includes a sidewall vertically extending from an outermost horizontal bar, and the assembly method further includes mounting the light source substrate on the sidewall of the reinforcement frame along the horizontal side of the liquid crystal panel. In another embodiment, the light source substrate further includes a plurality of light emitting diode arrays and a base bendably coupled to the plurality of light emitting diode arrays, and the assembly method further includes mounting the base of the light source substrate on the outermost horizontal bar of the reinforcement frame along the horizontal side of the liquid crystal panel. In one embodiment, mounting the light source substrate on the sidewall of the reinforcement frame further includes securing the light source substrate on the sidewall with an engagement pin.

In one embodiment, the assembly method further includes mounting the light source substrate on the sidewall of the reinforcement frame further comprises mounting a light source housing between the sidewall of the reinforcement frame and the light source substrate. In another embodiment, the assembly method further includes providing the light source substrate which comprises a base and a plurality of light source arrays bendably coupled to the base, two neighboring light source arrays being spaced apart from each other and each light source array protruding from the base and forming a substantially perpendicular angle relative to the base when bended, whereby the base is curved along the horizontal side of the liquid crystal panel.

In another embodiment, the assembly method further includes mounting the light source substrate comprises mounting the light source substrate along the vertical side of the liquid crystal panel. In this embodiment, securing the light guide plate further includes securing the light guide plate on the bottom cover with an engagement member and arranging the engagement member in a space between the light emitting surface of the light source substrate and the light receiving surface of the light guide plate. In further another embodiment, the assembly method further includes providing the light source substrate which comprises a plurality of light emitting diode arrays arranged on a printed circuit board, the light source substrate configured to be flat.

The backlight assembly according to the above-described embodiments may prevent misalignment between a reinforcement bar and a light source substrate. Furthermore, the backlight assembly may include a light source substrate be bendable along to the size and curvature of the reinforcement bar.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings:

FIG. 7A(1) illustrates the light guide plate and the curved bottom curve before attachment, and FIG. 7A(2) illustrates separation between the curved light guide plate and the curved bottom curve after attachment; FIG. 7B(1) illustrates a cross-sectional view of a curved bottom cover and FIG. 7B(2) illustrates a curved light guide plate for use in the curved LCD device without separation; and FIG. 7C illustrates a top view showing the curved light guide plate secured on the curved bottom cover with securing mechanism;

FIG. 9A illustrates one example of a display without visual defects or distortion due to separation between the light guide plate and the bottom cover; and FIG. 9B is a display having visual defects or distortion based on the separation as shown in FIG. 28.

FIG. 11A illustrates another embodiment of arrangement mechanism for arranging an optical sheet on the edge reinforcement bar and FIG. 11B is a cross-sectional view of a portion of the arrangement mechanism of FIG. 11A.

FIG. 12A illustrates possible arrangements of light source structures in connection with the curved LCD device; FIG. 12B(1) illustrates one embodiment of a vertical arrangement of a light source substrate along one left side of the curved LCD device; FIG. 12B(2) illustrates a cross sectional view of the vertical arrangement of the light source substrate as shown in FIG. 12B(1); and FIG. 12C(1) illustrates another embodiment of a horizontal arrangement of a light source substrate along a lower side of the curved LCD device; FIG. 12C(2) illustrates a cross sectional view of the horizontal arrangement of the light source substrate.

FIG. 13 is a cross-sectional view of one embodiment of a curved LCD device having a vertically arranged light source structure along a left side of the LCD panel;

FIG. 21A-21C illustrates a process of assembling the edge reinforcement bar and a pin wherein FIG. 21A illustrates the pin and the edge reinforcement bar before engagement, FIG. 21B illustrates the pin being engaged with the edge reinforcement bar and FIG. 21C illustrates the pin and the edge reinforcement bar after engagement;

FIG. 27B(1), FIG. 27B(2), FIG. 27B(3) and FIG. 27B(4) illustrate various defects of the conventional reinforcement frame configured to be curved.

DETAILED DESCRIPTION OF THE EMBODIMENTS

Figure 1A:
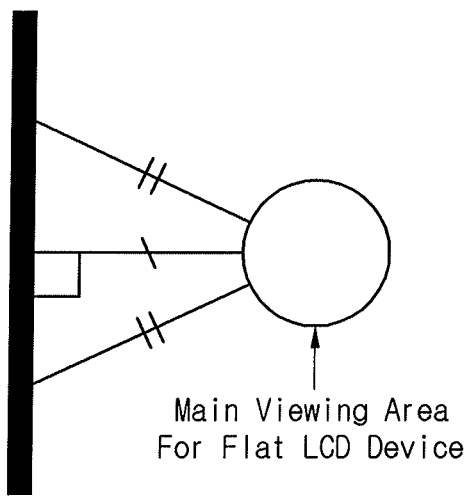
FIG. 1A illustrates a flat LCD device and FIG. 1B illustrates a curved LCD device with respect to a main viewing position.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. In the drawings, the size, thickness and so on of a device can be exaggerated for convenience of explanation. Wherever possible, the same reference numbers will be used throughout this disclosure including the drawings to refer to the same or like parts.

In the present disclosure, it will be understood that when an element, such as a substrate, a layer, a region, a film, or an electrode, is referred to as being formed "on" or "under" another element in the embodiments, it may be directly on or under the other element, or intervening elements (indirectly) may be present. The term "on" or "under" of an element will be determined based on the drawings.

Embodiments of the present disclosure are directed to a curved LCD device and an assembly method of the curved LCD device. The curved LCD device has a curved reinforcement frame and a flat bottom cover attached to the curved reinforcement frame such that the bottom cover is configured to be curved. The flat bottom cover is processed to have holes and/or tabs if needed before the attachment to the curved reinforcement frame. A light guide plate is mounted on the curved bottom cover and the reinforcement frame and secured with engagement members such that there is no separation between the light guide plate and the curved bottom cover. On the light guide plate, an optical sheet is applied on and along an edge of the reinforcement frame. In one embodiment, the optical sheet is arranged between two neighboring engagement members of the light guide plate.

Necessary processing is performed to the bottom cover prior to attachment to the reinforcement frame, i.e., before the bottom cover becomes curved and therefore, special processing in a direction normal to a curved surface can be avoided. Normal direction processing may be needed if holes and tabs are formed on a curved surface of a bottom cover. As the light guide plate is tightly secured on the bottom cover, visual defects or distortions which may result from a separation between the light guide plate and the bottom cover are likely to be substantially reduced.

In one embodiment, a backlight unit may be arranged vertically along at least one of left, or right side of the curved LCD device. In another embodiment, a backlight unit may be arranged horizontally along at least one of upper or lower side of the curved LCD device.

Embodiments of an assembly method of a curved LCD device include mounting a flat bottom cover on a curved reinforcement frame such that the flat bottom cover becomes curved due to attachment to the curved reinforcement frame, mounting flat optical sheets and a flat light guide plate on the bottom cover and the reinforcement frame, mounting a LCD panel and mounting a curved top cover thereon. The reinforcement frame includes at least one horizontally extending bar and at least one sidewall. The light guide plat is secured on at least one side wall of the reinforcement frame which extends perpendicular to the horizontally extending bar.

Figure 1B:
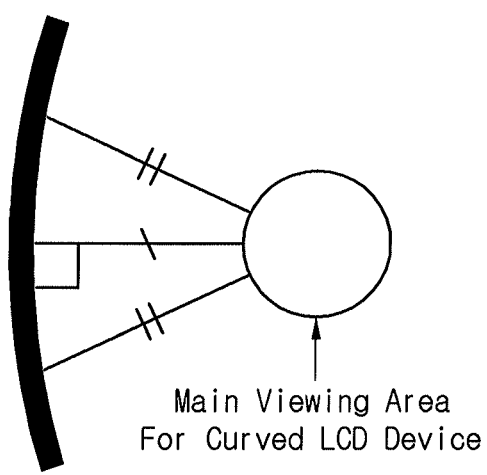

FIG. 1A illustrates a conventional flat LCD device and FIG. 1B illustrates a curved LCD device. From a main viewing area, the conventional flat LCD device has different distances to the main viewing area. In other words, a distance between a display surface of a center region of the conventional flat LCD device and the main viewing area is shorter than a distance between edges of the display surface of the conventional flat LCD device and the main viewing area, as shown in FIG. 1A. On the other hand, the curved LCD device shows equal distance between a display surface of the curved LCD device and the main viewing area, as shown in FIG. 1B. The curved LCD TV is appealing to consumers as its design is aesthetically and functionally improved.

Figure 2:
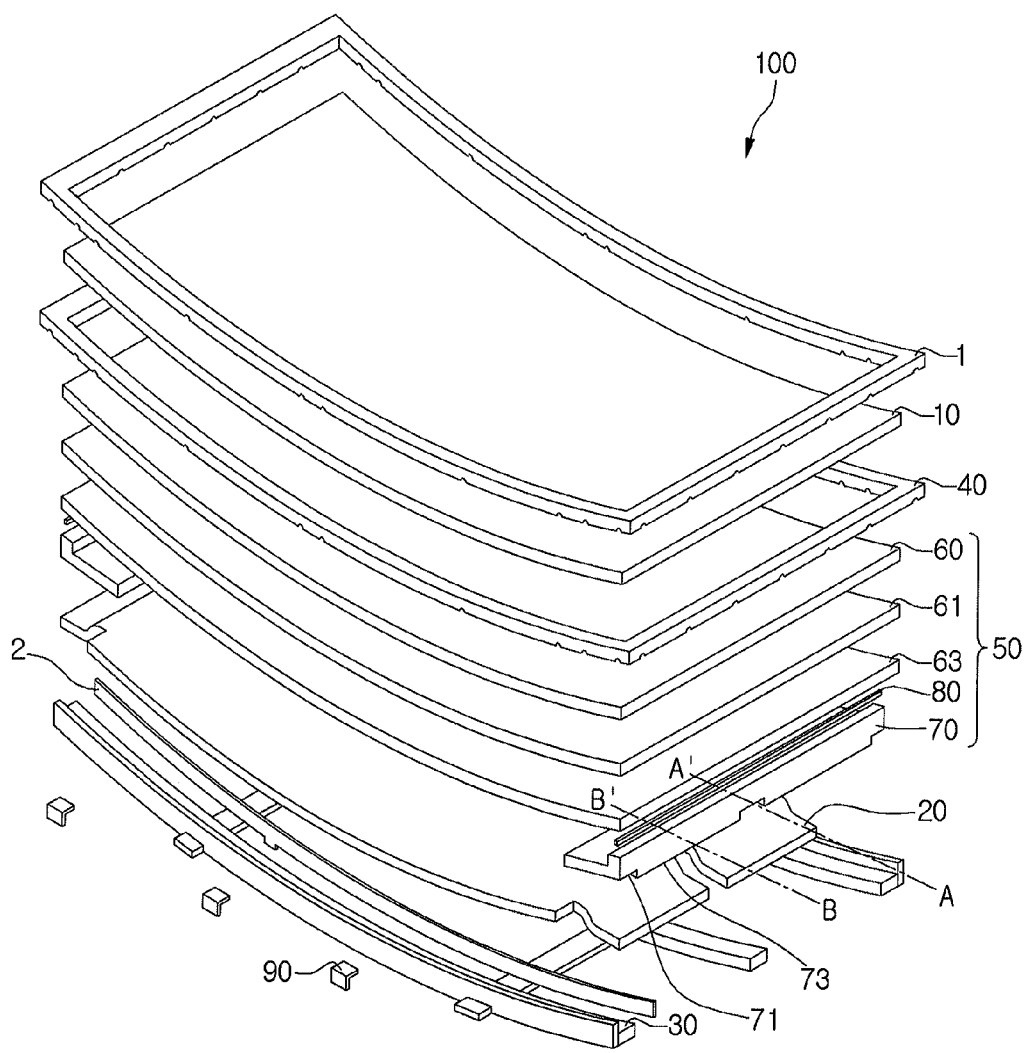
FIG. 2 is a disassembled perspective view showing one embodiment of a curved LCD device according to the present disclosure.
Figure 3:
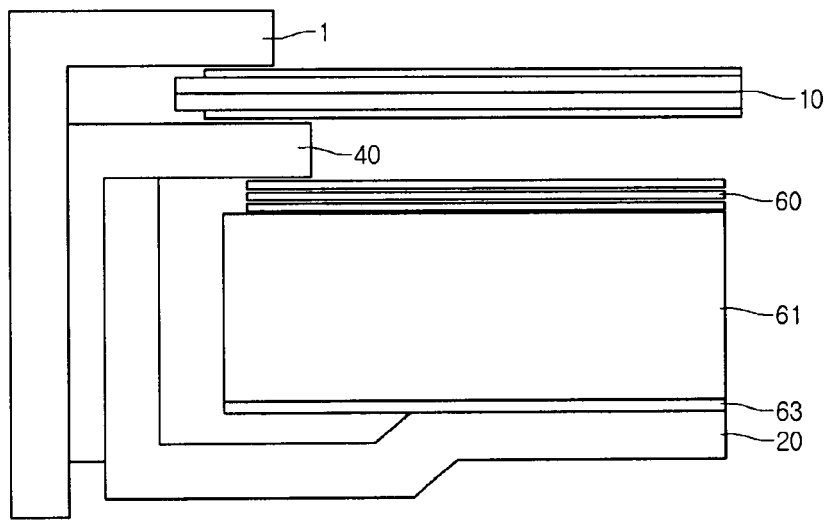
FIG. 3 is a cross-sectional view showing one embodiment of a curved LCD device according to the present disclosure.

FIG. 2 is a disassembled perspective view showing a curved LCD device 100 according to an embodiment of the present disclosure. FIG. 3 is a cross-section view showing the LCD device of FIG. 2. Referring to FIG. 2, the curved LCD device 100 according to an embodiment of the present disclosure includes an LCD panel 10 configured to display an image, and a backlight unit 50 configured to apply light to the LCD panel 10.

The LCD panel 10 includes a thin formed transistor substrate 11 and a color filter substrate 13 (shown in FIG. 14A) attached to the thin formed transistor substrate 11 with a cell cap defined therebetween. Also, the LCD panel 10 further includes a light crystal layer (not shown) interposed between the two substrates 11 and 13.

The thin film transistor substrate 11 includes a plurality of gate lines and a plurality of data lines formed thereon. A pixel region can be defined by the gate and data lines crossing each other. The gate line and the data line can be electrically connected to a thin film transistor. The thin film transistor is electrically connected to a pixel electrode which is formed on a pixel region.

The color filter substrate 13 includes red R, green G and blue B color filters arranged on regions opposite to the pixel regions of the thin film transistor substrate 11, and a black matrix disposed on a boundary region between the color filters and regions opposite to the gate line, the data line and the thin film transistor. The black matrix can prevent light leakage. Also, the color filter substrate 13 can include a common electrode formed on an inner surface of the color filter substrate 13 which faces the thin film transistor 11.

An electric field can be generated between the pixel electrode and common electrode by a difference between voltages which are applied to the pixel electrode and the common electrode. Liquid crystal molecules of the liquid crystal layer being realigned by the electric field can control light transmittance. In accordance therewith, an image can be displayed.

A top case 1 configured to protect the LCD panel 10 can be disposed on the front surface of the LCD panel 10. The top case 1 can be formed in a quadrilateral frame shape which faces edges of the front surface of the LCD panel 10. The top case 1 can be formed to have a curved surface with a fixed curvature.

The top case 1 can be formed through one of a roll molding process and a curved surface pressing process. The roll molding process can forms the top case 1 by passing a board between plural rollers. The curved surface pressing process cuts out a curve surface board, forms straight edge surfaces by applying a pressure to the curved surface board using a mold, and treats the cut surface of the board using a laser beam, in order to provide the top case 1.

A guide panel 40 formed in a quadrilateral frame shape can be disposed on the rear surface of the LCD panel 10. The guide panel 40 can be used to support the LCD panel 10. More specifically, the guide panel 40 supports edges of the rear surface of the LCD panel 10.

A bottom cover 20 can be disposed on the lower surface of the backlight unit 50. The bottom cover 20 supports the backlight unit 50. The bottom cover 20 is flexible and in the form of a flat board having flat surfaces in this embodiment. The backlight unit 50 includes an optical sheet 60, a light guide plate 61, a reflective sheet 63, a housing 70 and a light source 80. In this embodiment, the light source 80 is arranged along a vertical edge of the LCD device 100. In another embodiment, the light source 80 may be arranged along a horizontal edge of the LCD device 100.

FIG. 3 illustrates a cross-sectional view of a part of the curved LCD device 100. The top case 1 and the bottom cover 20 are arranged and the LCD panel 10, the guide panel 40, the optical sheet 60, the light guide plate 61, and the reflective sheet 63 are disposed between the top case 1 and the bottom cover 20.

Figure 27A:
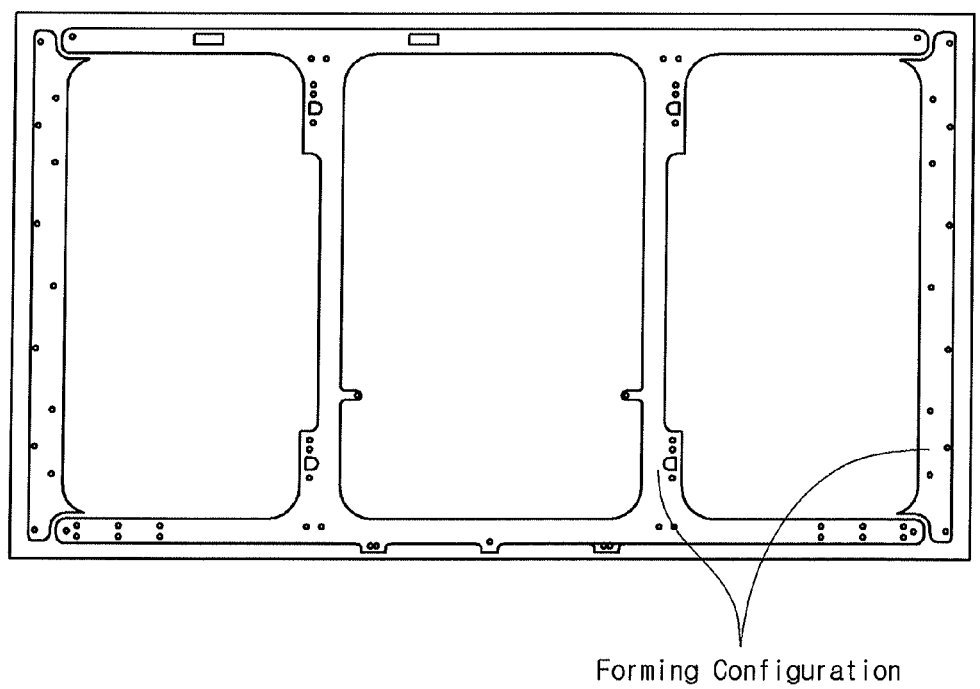
FIG. 27A illustrates a conventional reinforcement frame used for a flat LCD device.

FIG. 27A illustrates a conventional reinforcement frame for use with a conventional flat LCD device. As the conventional LCD device becomes slim, narrow, enlarged and low cost, at least a part of the conventional LCD device may be subject to distortion and twisting. The conventional reinforcement frame as shown in FIG. 27A is used to be arranged on a rear surface of the conventional LCD device and operates as structure for supporting the conventional LCD device. The conventional reinforcement frame is manufactured by applying a press on a flat steel plate to form the configuration as shown in FIG. 27A. Such configuration may improve the strength of the conventional reinforcement frame. If the convention reinforcement frame is bent to be a curved shape for use with a curved LCD device, it may be subject to crack, collapse, wrinkles, bulging as shown in FIGS. 27B(1), 27B(2), 27B(3) and 27B(4).

Referring to FIGS. 4A-4D, the reinforcement frame 3 according to embodiments of the present disclosure is explained in detail. The reinforcement frame 3 is a rigid body and has a predetermined fixed curvature. In another embodiment, the reinforcement frame 3 may be manufactured to have a different curvature depending on consumer needs, hardware configurations of LCD devices, and/or many other factors. The reinforcement frame 3 includes a plurality of horizontal reinforcement bars 31, a plurality of vertical reinforcement bars 32 and edge reinforcement bars or sidewalls 33. The plurality of horizontal reinforcement bars 31 and the vertical reinforcement bars 32 form a base portion for supporting the bottom cover 1 and the backlight unit 9 thereon. The edge reinforcement bars or sidewalls 33 extend vertically from the base portion and along opposing side edges of the base portion.

Each of the horizontal reinforcement bars 31 has a predetermined fixed curvature and an upward curved bar shape as it goes from the center toward both ends. In other words, the horizontal reinforcement bars 31 can be bent or curved in the z-axis shown in FIGS. 4A and 4B.

The vertical reinforcement bars 32 are used to connect the horizontal reinforcement bars 31 with one another and are straight without any curvature. To this end, the vertical reinforcement bars 32 can be arranged parallel to one another and perpendicular to the horizontal reinforcement bars 31. Each of the vertical reinforcement bars 32 is formed in a straight line shape.

The edge reinforcement bars or sidewalls 33 are disposed on outer side surfaces of the outermost horizontal reinforcement bars 31 and are perpendicular to the horizontal reinforcement bars 32. Each of the edge reinforcement bars or sidewalls 33 is formed in such a manner as to protrude above the upper surface of the outermost horizontal reinforcement bar 31. The edge reinforcement bars 33 are used to fasten both side surfaces of the bottom cover 1 as will be described in detail below.

Also, each of the edge reinforcement bars or sidewalls 33 is formed to have the same curvature as the horizontal reinforcement bar 31. The edge reinforcement bars or sidewalls 33 are formed integrally with the outermost horizontal reinforcement bars 31 to form a one-piece component. In one embodiment, the edge reinforcement bars or sidewalls 33 and the horizontal reinforcement bars 31 may form a single body. Alternatively, the edge reinforcement bars or sidewalls 33 can be formed separately from the outermost horizontal reinforcement bars 31 and are later assembled to the outermost horizontal reinforcement bars 31.

Figure 4A:
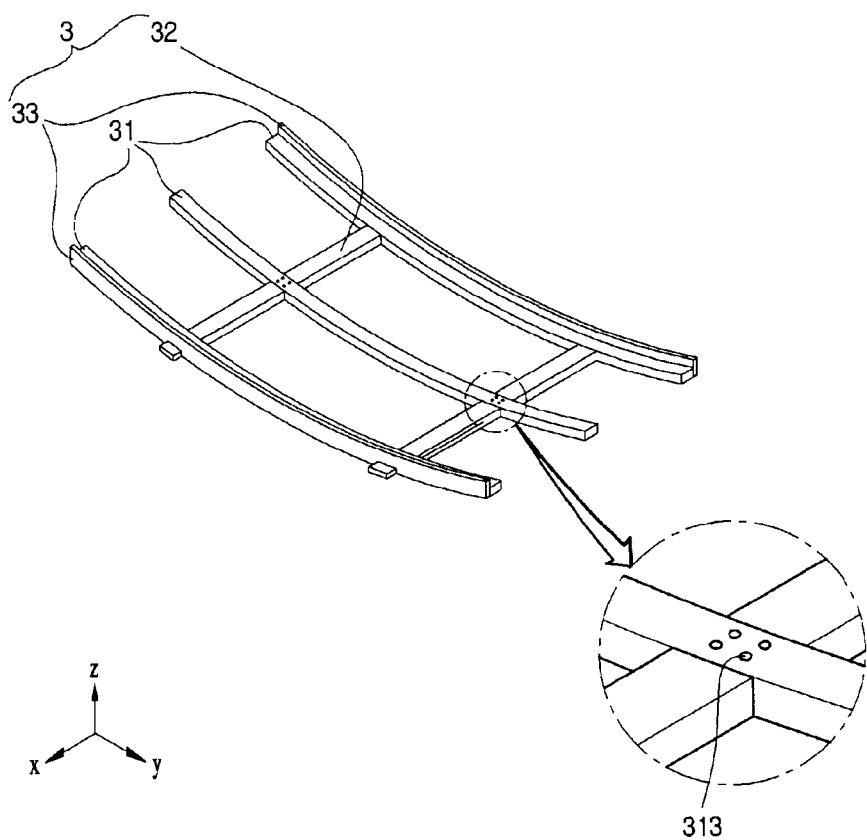
FIG. 4A is a perspective view showing a reinforcement frame shown in FIG. 2.
Figure 4B:
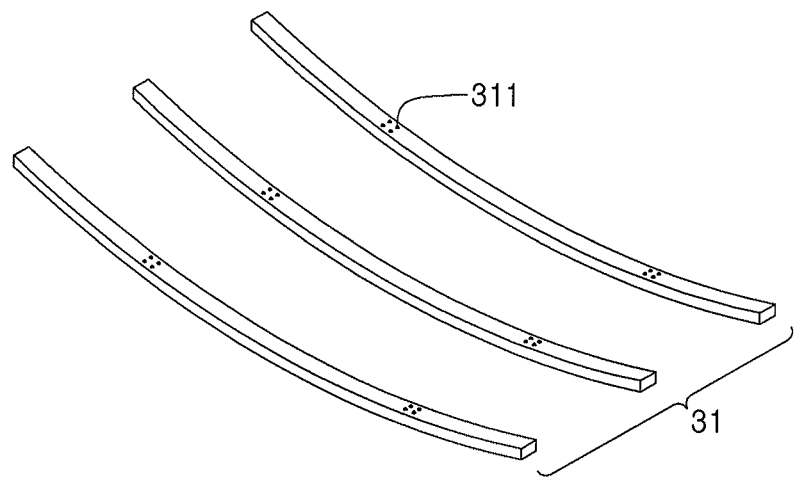
FIG. 4B is a perspective view showing horizontal reinforcement bars shown in FIG. 4A.
Figure 4C:
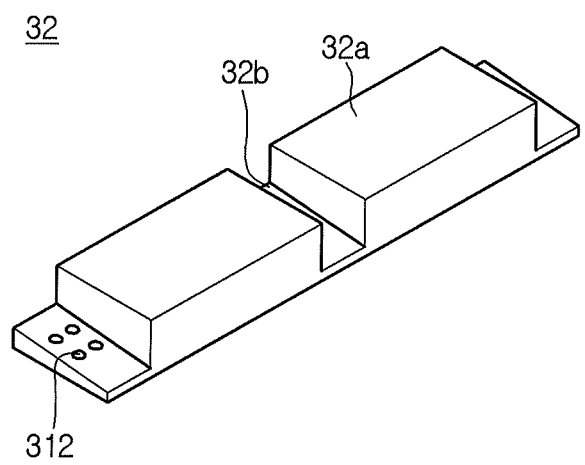
FIG. 4C is a perspective view showing a vertical reinforcement bar shown in FIG. 4A.
Figure 4D:
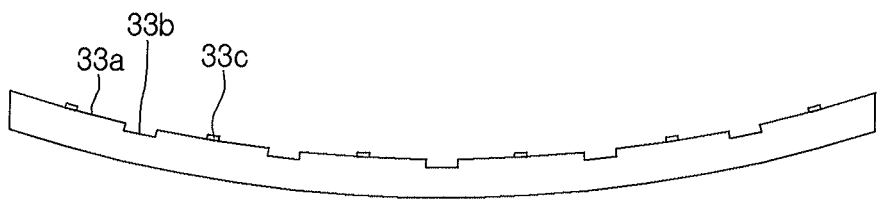
FIG. 4D is a perspective view showing an edge reinforcement bar shown in FIG. 2.

FIG. 4B is a perspective view showing the horizontal reinforcement bars shown in FIG. 4A. FIG. 4C is a perspective view showing the vertical reinforcement bar shown in FIG. 4A. FIG. 4D is a perspective view showing the edge reinforcement bar shown in FIG. 1. As shown in FIGS. 4A and 4B, each of the horizontal reinforcement bars 31 can be formed to have at least one through hole 311 which is formed in a region where the vertical reinforcement bars 32 extend across the horizontal reinforcement bars 31.

Referring to FIGS. 4A and 4C, each of the vertical reinforcement bars 32 can include main body portions 32a and recessed portions 32b recessed from a top surface of the main body portions 32a. The recessed portions 32b can be formed by partially cutting the main body portion 32a. At least one combination hole 312 can be formed in each of the recessed portions 32b. The combination hole 312 can be formed at a position opposite (or corresponding) to the through hole 311. The horizontal reinforcement bars 31 can be received into the recessed portions 32b and fastened by means of fastening members 313 (FIG. 4A).

The fastening member 313 is inserted into the combination hole 312 and the through hole 311 to firmly fasten the horizontal reinforcement bars 31 to the vertical reinforcement bars 32. In this case, the horizontal reinforcement bars 31 are received into the recessed portions 32b. The horizontal reinforcement bars 31 can have upper surfaces in flush with the upper surfaces of the vertical reinforcement bars 33 when they are assembled. As such, the reinforcement frame 3 can have a smooth upper surface to be in contact with the bottom cover 1 without any protruded region.

As shown in FIG. 4D, the edge reinforcement bar 33 can be formed to include a side wall portions 33a, side concave portions 33b and side protrusions 33c. Other constructions are available in another embodiment. The side concave portions 33b are formed in such a manner as to be recessed from the top edge of the side wall 33a in a downward direction. The side protrusions 33c are formed in such a manner as to protrude from the top edge of the side wall 33a in an upward direction.

Figure 5:
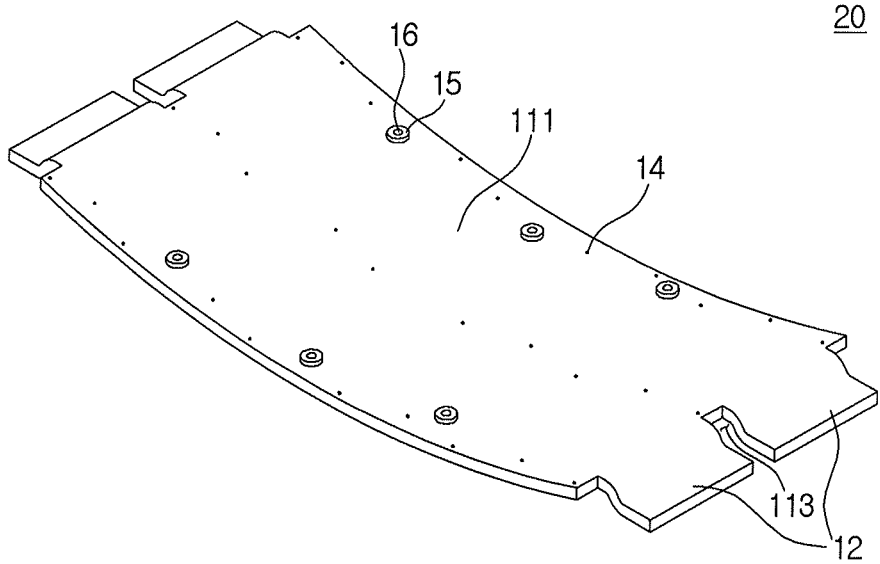
FIG. 5 is a perspective view illustrating a bottom cover shown in FIG. 1.

FIG. 5 is a perspective view showing the bottom cover shown in FIG. 2. Referring to FIGS. 2 and 5, the bottom cover 20 can include a body portion 111 and wings 12.

The wings 12 can be formed on both side edges of the body portion 111. The body portion 111 can be formed in an upward curved shape as it goes from the central region toward the left and right end regions. The body portion 111 is initially in flat shape and becomes curved as the bottom cover 20 is mounted and fastened on the curved reinforcement frame 3 as shown in FIGS. 4A and 6. Each of the wings 12 formed along the side edges of the body portion 111 can be branched in two parts. The wings 12 can be formed in such a manner as to extend from both side edges of the body portion 111 to define an L shape.

Each of the wings 12 is formed to have a receiving groove 113 in a region opposite to one end of the horizontal reinforcement bar 31. The receiving groove 113 is formed in an opening shape which is adapted to receive one end of the horizontal reinforcement bar 31. As such, one end of the horizontal reinforcement bar 31 is received in the receiving groove 13 to pass through the receiving groove 13 in a slanted manner.

Figure 27C:
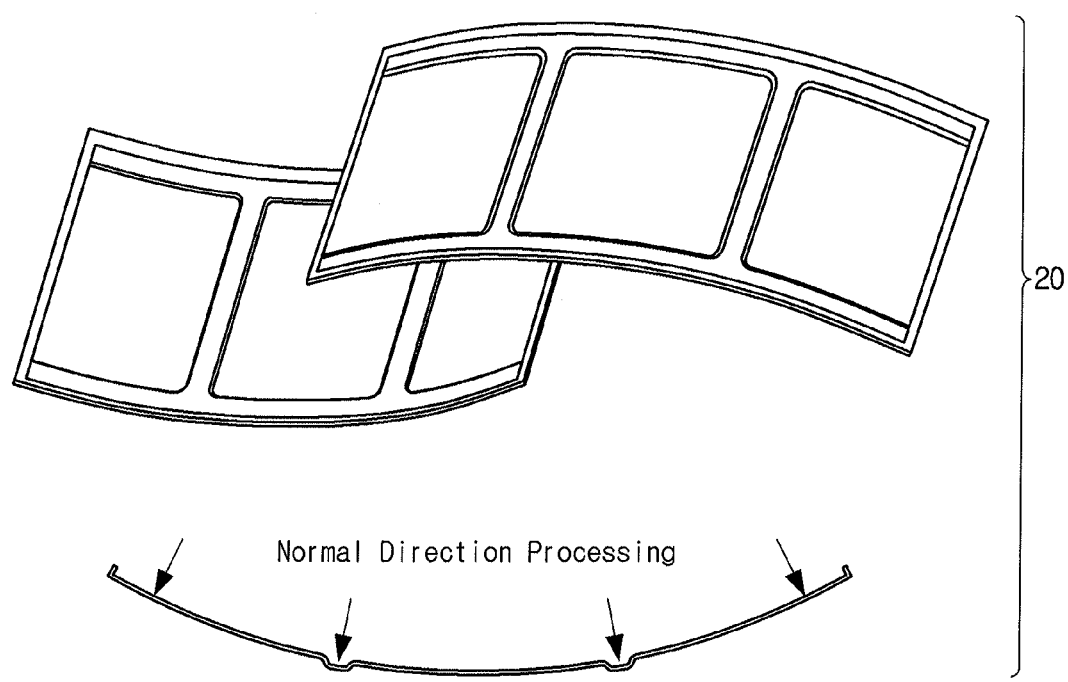
FIG. 27C illustrates a conventional curved bottom cover.

FIG. 27C illustrates normal direction processing which may be needed for a curved surface of a bottom cover. Once the bottom cover is curved and bent, it may be difficult to process a hole or a tap on the curved bottom cover. In order to properly form a hole or add a tap, processing may need to be done in a direction normal to the curved surface of the curved bottom cover as shown in FIG. 27C. Such normal processing may require special equipment and sophisticated and extensive labor, thereby increasing manufacturing expenses. Accordingly, embodiments of the present disclosure uses a flat bottom cover for processing holes or tabs and mounts the flat bottom cover on the curved reinforcement frame to make the bottom cover become curved.

Referring back to FIG. 5, a plurality of cover holes 14 can be formed in regions of the body portion 111 opposite to the horizontal reinforcement bars 31. Before the bottom cover 20 is mounted on the reinforcement frame 3, the cover holes 14 are formed on the bottom cover 20 having the flat shape. Accordingly, processing in a direction normal to the curved surface may not be needed and preparing holes and tabs can be easily done. The cover holes 14 can be formed in such a manner as to pass through the body portion 111. The body portion 111 can be attached to the horizontal reinforcement bars 31 by means of screws which pass through the respective cover holes 14 and into corresponding holes (not shown) in the horizontal reinforcement bars 31. As such, the bottom cover 20 can be attached to the reinforcement frame 3 and bent and maintain at the same curvature as the reinforcement frame 3.

Also, cover protrusions 15 can be formed on the body portion 111. The cover protrusions 15 protrude from the upper surface of the body portion 111. A cover combination hole 16 adapted to receive a combination member 54 can be formed in the central portion of each cover protrusion 15. As such, the cover protrusion 15 can be attached to the combination member 54 and fasten and support the light guide plate 7.

In one embodiment, the bottom cover 20 can be formed in such a manner that the body portion 111 has one of an uneven pattern (not shown) and an embossed pattern (not shown), but it is not limited to this. The body portion 111 with one of the uneven pattern and the embossed pattern can prevent deformation of the bottom cover 20 due to external environment such as temperature or others.

Figure 6A:
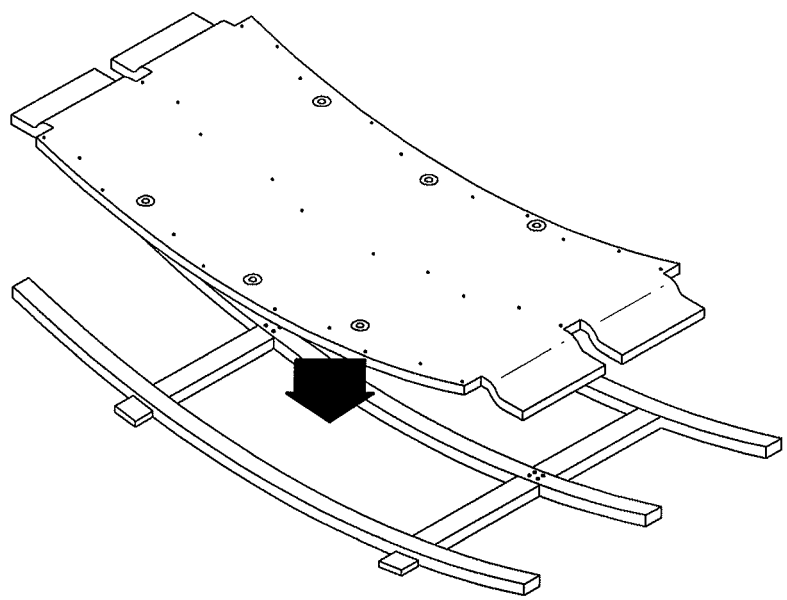
FIG. 6A illustrates that the bottom cover is arranged on the reinforce frame as shown in FIGS. 2 and 5 and FIG. 6B illustrates a curved bottom cover as a result of attachment to the curved reinforcement frame as shown in FIG. 6A.
Figure 6B:
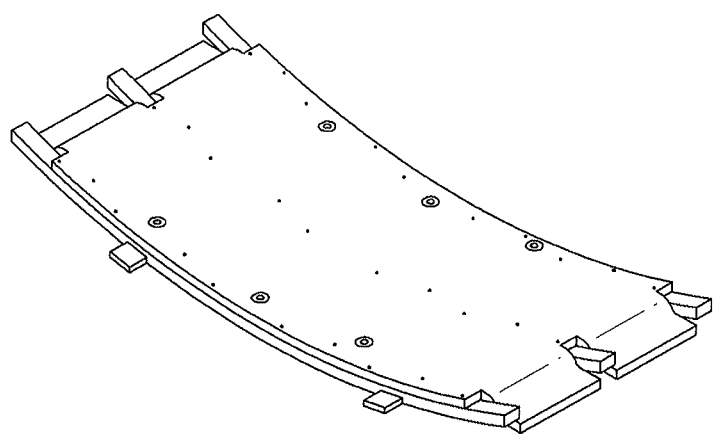

FIGS. 6A and 6B illustrate mounting the flat bottom cover 20 on the curved reinforcement frame 3. As the reinforcement frame 3 is curved as shown in FIG. 6A, the flat bottom cover 20 becomes curved (as shown in FIG. 6B) as it is mounted on and attached to the curved reinforcement frame 3. The bottom cover 20 is securely mounted on the reinforcement frame 3 with inserting screws in the cover holes 14 formed on the bottom cover 20 as shown in FIG. 5 and FIG. 6B.

On the curved bottom cover 20 and the curved reinforcement frame 3, the optical sheet 60, the light guide plate 61 and the reflective sheet 63 are sequentially formed. FIGS. 7A-7C illustrate securing the light guide plate 61 and the reflective sheet 63 on the curved bottom cover 20. The reflective sheet 63 is thin and relatively flexible. Accordingly, the reflective sheet 63 becomes curved and fits well on the curved surface of the curved bottom cover 20. However, the light guide plate 61 is relatively thicker and not as flexible as the reflective sheet 63 as shown in FIG. 3. If the light guide plate 61 is placed on the curved bottom cover 20, there may be small gap or separation as shown in FIGS. 7A(1) and 7A(2). A partial or entire separation between the light guide plate 61 and the curved bottom cover 20 may affect display quality and a viewer may perceive visual distortion or defect as shown in FIG. 9B. The embodiment of the present disclosure employs a securing mechanism for securing tightly the light guide plate 61 on the bottom cover 20 as shown in FIGS. 7B(1), 7B(2) and FIG. 7C. In this embodiment, the light source 80 is vertically arranged along the right side of the LCD panel 10. In another embodiment, a light source may be horizontally arranged along a lower side or an upper side of the LCD panel 10.

Figure 8A:
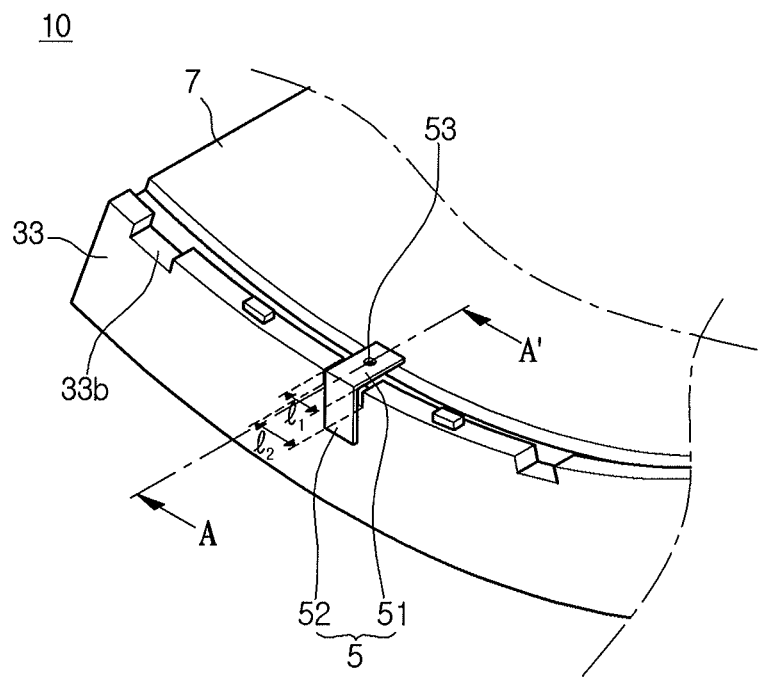
FIG. 8A is a perspective view illustrating one example of securing mechanism for securing the curved light guide plate in the reinforcement frame.
Figure 8B:
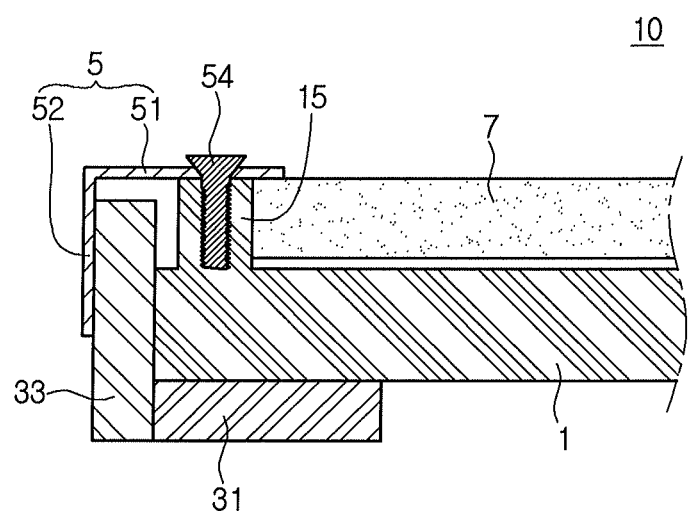
FIG. 8B is a cross section view of one example of securing mechanism.

The securing mechanism 50 includes engagement members 5. FIG. 8A is a perspective view illustrating an assembled state of the edge reinforcement bar 33, the engagement member 5, the bottom cover 20 and the light guide plate 61 which are shown in FIGS. 2 and 3. FIG. 8B is a cross-sectional view showing a dotted portion taken along line A-A' of FIG. 8A.

As shown in FIGS. 8A and 8B, an engagement member 5 can be disposed in the side concave portion 33b of the edge reinforcement bar 33. The engagement member 5 can be formed in an L shape. The engagement member 5 can be formed to have a narrower width than that of the side concave portion 33b. The engagement member 5 includes first and second planar portions 51 and 52. The first planar portion 51 comes in contact with the upper surface of the light guide plate 7 and the second planar portion 52 comes in contact with the outer surface of the edge reinforcement bar 33. As such, the engagement member 5 can fasten the light guide plate 7 to the reinforcement frame 3. In these embodiments, the engagement members 5 are arranged to avoid blocking the light source 80. In other embodiments, the engagement members 5 are arranged such that light path from a vertically or horizontally arranged light source substrate to a light guide plate can be secured.

Also, the engagement member 5 can include an engagement hole 53 formed in the first planar portion 51. The engagement hole 53 is formed opposite to the cover protrusion 15. As such, the combination member 54 passes through the engagement hole 53 and is inserted into the cover protrusion 15 of the bottom cover 1. Therefore, the engagement member 5 can securely and stably fasten the bottom cover 1 and the light guide plate 7 to the reinforcement frame 3. In other words, an engagement force toward the bottom cover 1 (i.e., in a downward direction) is applied from a part of the first planar portion 51 of the engagement member 5 to the light guide plate 7, because the width l1 of the engagement member 5 is narrower than the width l2 of the side concave portion 33b. Therefore, the engagement member 5 allows the light guide plate 7 to be stably supported by the bottom cover 1.

As the light guide plate 61 is tightly secured on the curved bottom cover 20, no separation or gap may be present as shown in FIG. 7B. FIG. 9A illustrates one example of showing that display quality may improve and visual defect as shown in FIG. 9B may be substantially minimized.

Figure 10:
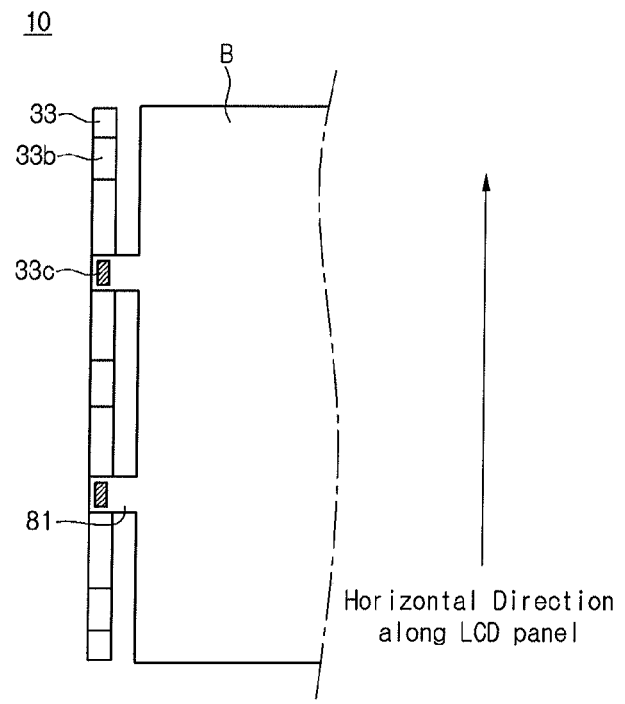
FIG. 10 illustrates one embodiment of arrangement mechanism for arranging an optical sheet on the edge reinforcement bar as shown in FIG. 2.

Once the light guide plate 61 is secured on the curved bottom cover 20, the optical sheet 60 is arranged on the light guide plate 6 as shown in FIGS. 2 and 3. Properly and securely arranging the optical sheet 60 may be critical to avoid visual defects or distortion that a viewer may perceive. During a manufacturing process of an LCD device, precise arrangement of an optical sheet is one of very important processes. The optical sheet 60 may be flexible and thin, so it may be easily adapted to the curved shape of the bottom cover 20 and the light guide plate 61. FIG. 10 is a perspective view showing an assembled state of the edge reinforcement bar 33 and the optical sheet 60 (also shown in FIGS. 2 and 3). Referring to FIG. 10, the optical sheet 60 can include at least one sheet protrusion 81 which protrudes from a side surface of the optical sheet 60. The sheet protrusion 81 can be formed to have a through hole which is formed opposite to the side protrusion 33c of the edge reinforcement bar 33. As such, the sheet protrusion 81 is disposed to receive the side protrusion 33c of the edge reinforcement bar 33. Therefore, the optical sheet 60 can be stably fastened to the edge reinforcement bar 33.

Figure 11A:
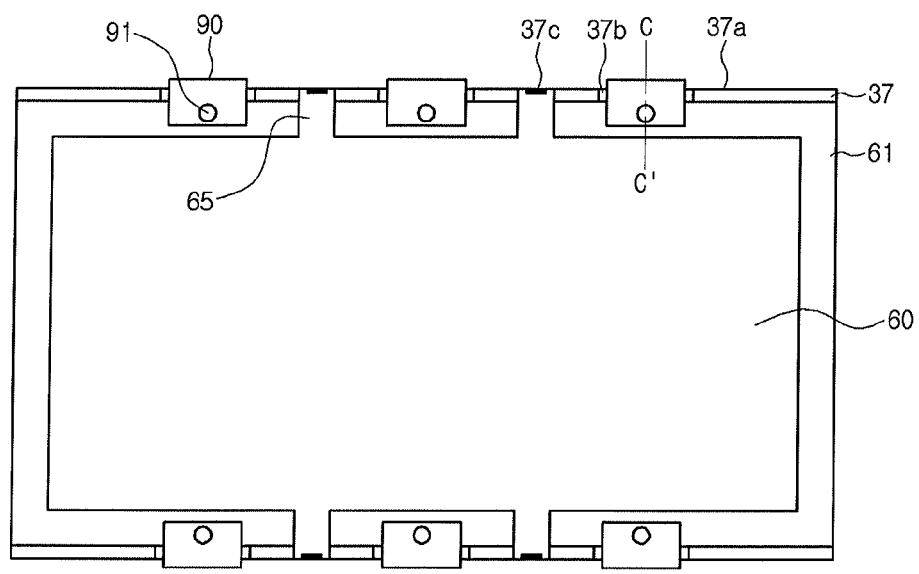

FIG. 11A is a plan view showing another embodiment of assembled structure of the reinforcement frame 3, the light guide plate 61 and the optical sheet 60. FIG. 11B is a side view showing securing mechanism and structure of the reinforcement frame 3, the light guide plate 61 and the optical sheet 60 of FIG. 11A. Referring to FIGS. 2, 11A and 11B, the reinforcement frame 3 of the LCD device 100 includes the horizontal reinforcement bar 31 formed to support the lower surface of the bottom cover 20, and the edge reinforcement bar 37 disposed on the side surface of the bottom cover 20. An engagement member 90 as shown in FIG. 11A will be further described in connection with FIG. 15 below.

In this manner, the bottom cover 20 can be formed in the same structure as the reinforcement frame 3 with the curved surface shape. As such, the detachment of the light guide plate 61 from the bottom cover 20 can be prevented. Also, the generation of a stain in an image due to detachment of the light guide plate 61 from the bottom cover 20 can be prevented. Therefore, the LCD device of a curved surface type can be realized.

The engagement forces between the reinforcement frame 30, the bottom cover 20, the optical sheet 60 and the light guide plate 61 can be increased. As such, damage of the LCD device due to external impacts can be prevented.

Such a curved surface type LCD device can enable distances of the central region and both edge regions of the LCD panel with respect to a main viewing position to be the same as one another. In other words, differences between the distances of the central region and both the edge region of the LCD panel with respect to the main viewing position can be minimized. Also, brightness of the curved surface type LCD device can be largely enhanced.

FIG. 12A illustrates possible arrangements of light sources in one embodiment of the curved LCD device according to the present disclosure. Light sources can be arranged at each side, horizontal sides (or, upper or lower sides), vertical sides (or, left or right sides), or a single light source at either a horizontal (lower) side or a vertical (right) side, as shown in FIG. 12A. FIG. 12B(1) illustrates one embodiment of the curved LCD device having a light source substrate at a vertical or left side. FIG. 12B(2) illustrates a cross section view of the light source substrate as shown in FIG. 12B(1). FIG. 12C(1) illustrates one embodiment of the curved LCD device having a light source substrate along a horizontal or lower side. FIG. 12C(2) illustrates a cross section view of the light source substrate as shown in FIG. 12C(1).

Referring to FIGS. 13-14, embodiments of the curved LCD device having a vertically arranged light source substrate along a left side of the LCD panel are described. FIG. 13 illustrates a cross-sectional view of a vertically arranged light source substrate 220 in a curved LCD device 200. The LED light source substrate 220 is arranged side to a light guide panel 207 and guided by a light guide 203 into the light guide plate 207. An LCD panel 205 is arranged above the light guide panel 207. The LCD panel 205 and optical elements are covered by a top cover 222 and a bottom cover 224. A reflector 209 is disposed underneath the light guide plate 207. As the vertical side of the curved LCD device 200 is not curved but straight, the LED light source substrate 220 is arranged along the straight vertical side of the curved LCD device 200. The curved LCD device 200 may be implemented to be a LCD TV which requires relatively a large amount of light. As illustrated in FIG. 13, a top view type of the LED light source substrate 220 may be suitable for implementing the LCD TV. The light source substrate 220 may need to be arranged perpendicular to the light guide plate 207 in order to ensure that light can be entered into the light guide plate 207.

Figure 14A:
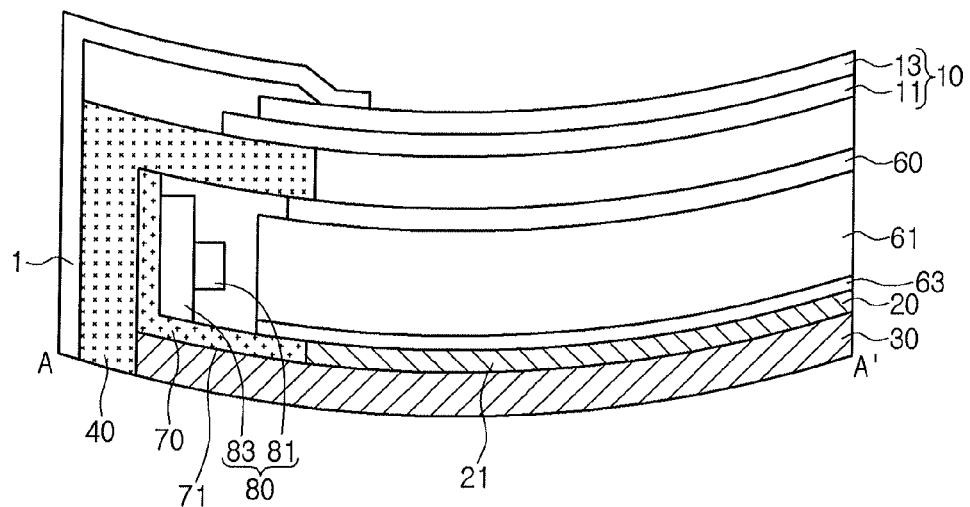
FIGS. 14A and 14B are other embodiments of a curved LCD device having the vertically arranged light source structure.
Figure 14B:
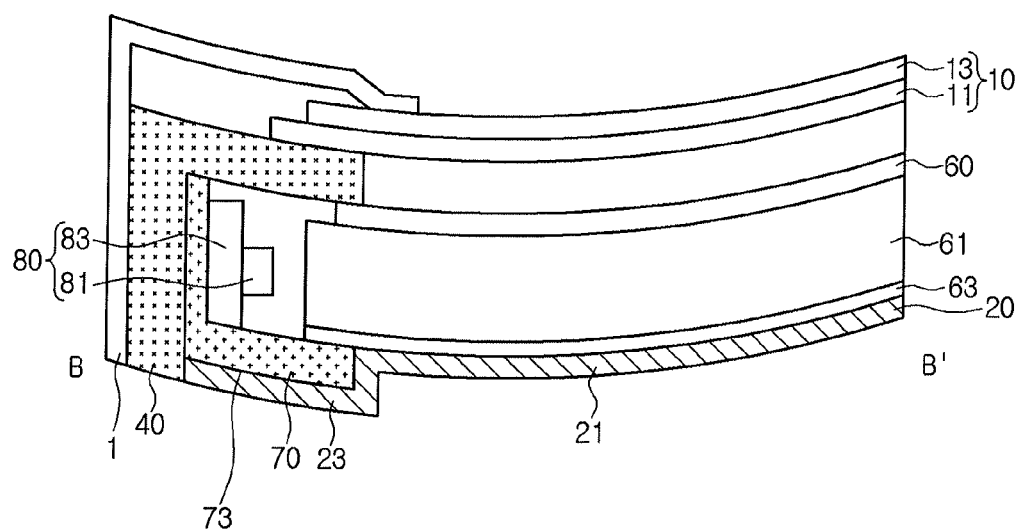

FIGS. 14A and 14B are cross-sectional views showing sections of the LCD device according to another embodiment of the present disclosure. FIG. 14A is a cross-sectional view showing the LCD device taken along a line A-A' in FIG. 2. FIG. 14B is a cross-sectional view showing the LCD device taken along a line B-B' in FIG. 2. Referring to FIGS. 2, 14A and 14B, the LCD device of the present embodiment includes the LCD panel 10 and the backlight unit 50.

As shown in FIGS. 14A and 14B, the LCD panel 10 can include the thin film transistor substrate 11 and the color filter substrate 13. The backlight unit 50 can include the optical sheet 60, the light guide plate 61, the reflective sheet 63, the housings 70 and the light source 80. The backlight unit 50 can be supported by the bottom cover 20. The reflective sheet 63 is disposed on the body portion 21 of the bottom cover 20 (see also FIG. 5). The housings 70 can be disposed on the wings 23 of the bottom cover 20. The body portion 21 and the wing 23 can be formed at different elevations to form a step therebetween.

The reinforcement frame 30 can be attached and fastened to the lower surface of the bottom cover 20. The housing 70 can contact the reinforcement frame 30 in the region corresponding to the receiving groove 24 of the bottom cover 20, as shown in FIG. 14A. Also, the housing 70 can contact the wing 23 of the bottom cover 20 in the region corresponding to the wing 23 of the bottom cover 20, as shown in FIG. 14B.

As shown in FIG. 2, the housing grooves 71 are formed in the regions of the housing 70 opposite to the reinforcement frame 30, and the planar portion 73 is formed in the region of the housing 70 opposite to the wing 23 of the bottom cover 20. Therefore, the housings 70 can be closely fastened to the reinforcement frame 30 and the bottom cover 20.

The light source 80 can be attached to at least one of the housings 70. The light source 80 can include a light emission diode package 81 and a printed circuit board 83. The light emission diode package 81 is mounted to the printed circuit board 83. The light emission diode package 81 emits light toward the light guide plate 61 in response to a drive current from the printed circuit board 83.

Although the light source 80 is configured with the light emission diode package 81 as shown in the drawings, it is not limited to this. In other words, the light source 80 can include a lamp instead of the light emission diode package 81. As an example of the lamp, one of a CCFL (a cold cathode fluorescent lamp) and an EEFL (an external electrode fluorescent lamp) can be used.

The guide panel 40 can be in contact with the housings 70. Also, the guide panel 40 can support the LCD panel 10. The top case 1 can be formed to encompass the edges of the LCD panel 10.

Figure 15:
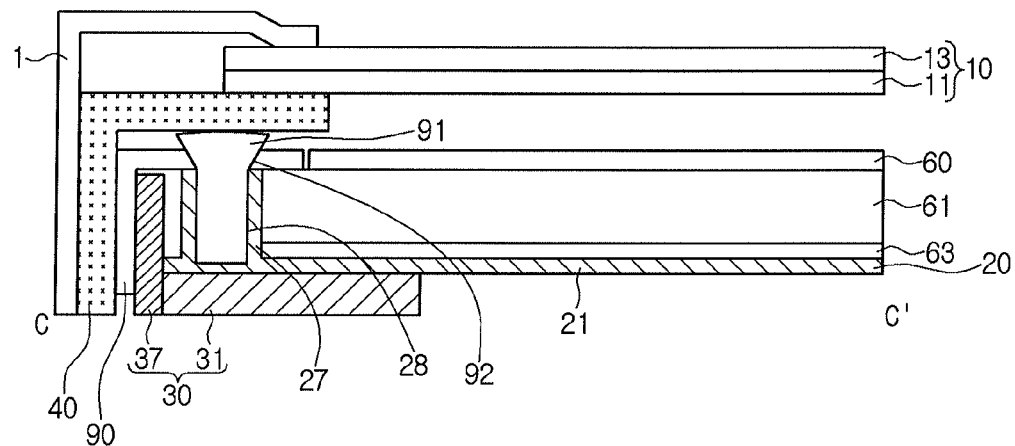
FIG. 15 is a perspective view illustrating a combination state of the edge reinforcement bar, an engagement member, the bottom cover and a light guide plate along with a horizontally arranged light source structure in the curved LCD device.

Referring to FIGS. 15-26, embodiments of a curved LCD device having a horizontally arranged light source substrate is described in detail. FIG. 15 is a cross-sectional view of the curved LCD 200. The curved LCD 200 has the structures disclosed in FIG. 2, other than the horizontally arranged light source substrate. FIG. 15 shows that the reflective sheet 63, the light guide plate 61 and the optical sheet 60 can be sequentially disposed on the bottom cover 20. The edge reinforcement bar 37 can include the side wall portions 37a, the side concaves 37b and the side protrusions 37c, as shown in FIGS. 2 and 11B. Detailed descriptions on the structures which are previously discussed in connection with FIGS. 2 and 11B are omitted here.

The optical sheet 60 can include a plurality of edge tabs 65 each protruding outwardly from its edges. The plurality of edge tabs 65 can be formed opposite to the plurality of side protrusions 37c, as shown in FIGS. 11A and 11B. Each of the edge tabs 65 can be formed to have a through hole. The optical sheet 60 can be stably fastened to the edge reinforcement bar 37 by inserting the side protrusions 37c of the edge reinforcement bar 37 into the through holes of the edge tabs 65 of the optical sheet 60.

The plurality of cover protrusions 16 can be formed on the body portion 111 of the bottom cover 20, as shown in FIG. 5. The cover protrusions 16 are formed in the regions of the body portion 111 opposite to the side concaves 37b of the edge reinforcement bar 37. Also, the cover protrusions 16 can be formed in such a manner as to protrude from the upper surface of the body portion 111 of the bottom cover 20. The cover combination hole 15 can be formed in the central region of each of the cover protrusions 16. The cover protrusions 16 and the bottom cover 20 can be integrally formed as a one-piece component.

As shown in FIG. 15, the engagement member 90 can be disposed in a region opposite to the cover protrusion 16 of the bottom cover 20 (see also FIGS. 11A and 11B). The engagement member 90 can be formed in an L shape with horizontal and vertical portions. The horizontal portion of the engagement member 90 can be in contact with the cover protrusion 27 of the bottom cover 20 and the light guide plate 61. The vertical portion of the engagement member 90 can be in contact with the outer side surface of the edge reinforcement bar 37. The width of the horizontal portion of the engagement member 90 may be narrow.

An engagement hole 92 can be formed in the horizontal portion of the engagement member 90. The engagement hole 92 can be formed in such a manner as to penetrate through the horizontal portion of the engagement member 90. The engagement hole 92 can be formed in a region of the horizontal portion of the engagement member 90 opposite to the cover combination hole 28 of the cover protrusion 27.

The securing member 91 can be inserted into the engagement hole 92 and the cover combination hole 28. The securing member 91 inserted into the engagement hole 92 and the cover combination hole 28 can closely fasten the light guide plate 61 to the bottom cover 20. As such, the securing member 91 inserted into the engagement hole 92 and the cover combination hole 28 can apply an engagement force to the engagement member 90. The engagement member 90 can transfer the engagement force toward the bottom cover 20 through the light guide plate 61. Therefore, the light guide plate 61 can be stably fastened to the bottom cover 20. The side concave portion 37b can formed to be wider than the engagement member 90. As such, the position of the engagement member 90 can be adjusted within the width of the side concave portion 37b. Therefore, the engagement member 90 can stably fasten the light guide plate 61 to the bottom cover 20.

FIGS. 16-26 illustrate other embodiments of a horizontally arranged light source substrate for use with a curved LCD device. FIG. 16A is a disassembled perspective view showing an edge reinforcement bar 33 and a light source substrate 2 according to a first embodiment of the present disclosure.

Figure 16A:
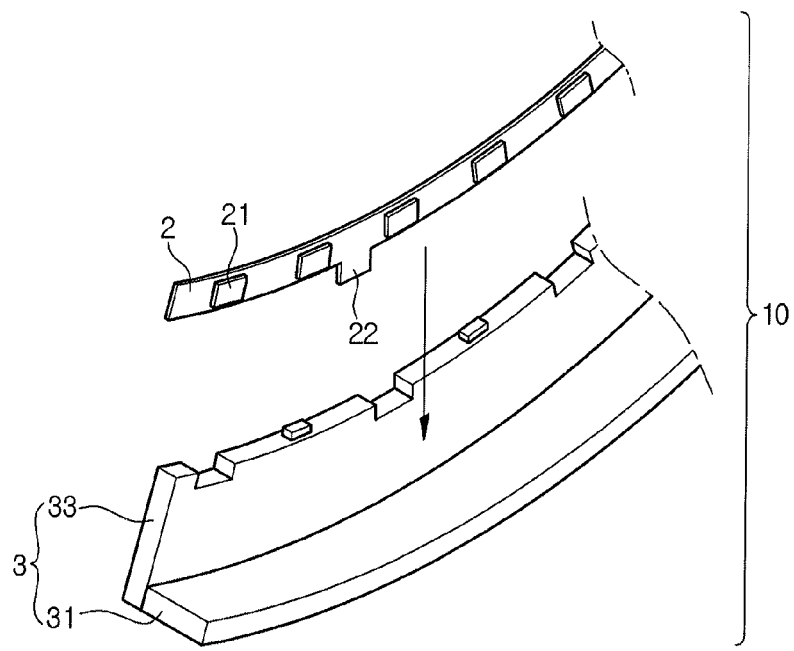
FIG. 16A is a disassembled perspective view showing an edge reinforcement bar and a horizontal light source substrate according to a first embodiment of the present disclosure.

As shown in FIG. 16A, the light source substrate 2 is disposed on the inner surface of an edge reinforcement bar 33 of the reinforcement frame 3. The light source substrate 2 is flexible and can be bent to have the same curvature and shape as the edge reinforcement bar 33 when the light source substrate 2 is attached to the edge reinforcement bar 33.

Also, the light source substrate 2 includes at least one light source 21 and a connector 22. The at least one light source 21 can include a plurality of light sources which are arranged on the light source substrate 2 in such a manner as to be separated from one another. The light source 21 includes a light emitting diode (LED), but it is not limited to this. At least one substrate protrusion is formed in such a manner as to protrude from an edge of the light source substrate 2. The connector 22 can be disposed on the substrate protrusion, but it is not limited to this.

Figure 16B:
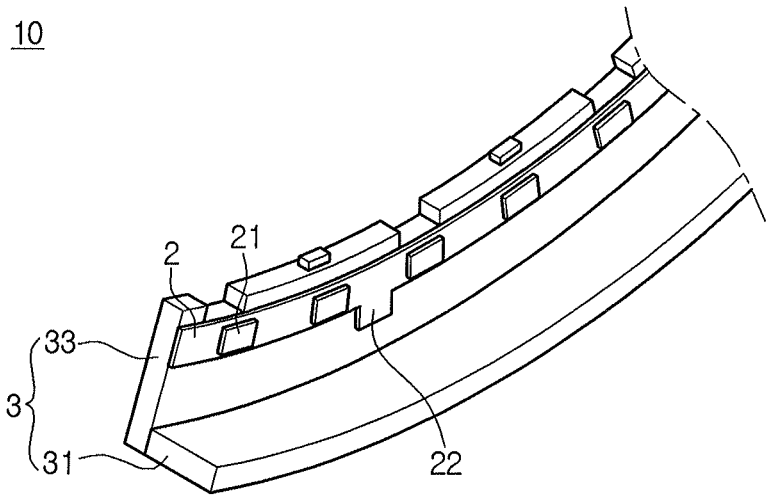
FIG. 16B is a perspective view illustrating a combination state of the edge reinforcement bar and the horizontal light source substrate according to the first embodiment of the present disclosure.

FIG. 16B is a perspective view illustrating an assembled state of the edge reinforcement bar 33 and the light source substrate 2 according to the first embodiment of the present disclosure. As shown in FIG. 16B, the light source substrate 2 is disposed on the inner surface of the edge reinforcement bar 33 by means of an adhesive member (not shown) which is attached to the entire rear surface of the light source substrate 2. The adhesive member can fasten the light source substrate 2 to the inner surface of the edge reinforcement bar 33. Also, the adhesive member can be used to transfer heat generated in the light source substrate 2 to the edge reinforcement bar 33.

The light source substrate 2 can be disposed only on one of the edge reinforcement bars or sidewalls 33 which are positioned at both the edges of the reinforcement frame 3. Alternatively, the light source substrate 2 can be disposed on the edge reinforcement bars or sidewalls 33 which are positioned at both edges of the reinforcement frame 3.

Figure 17A:
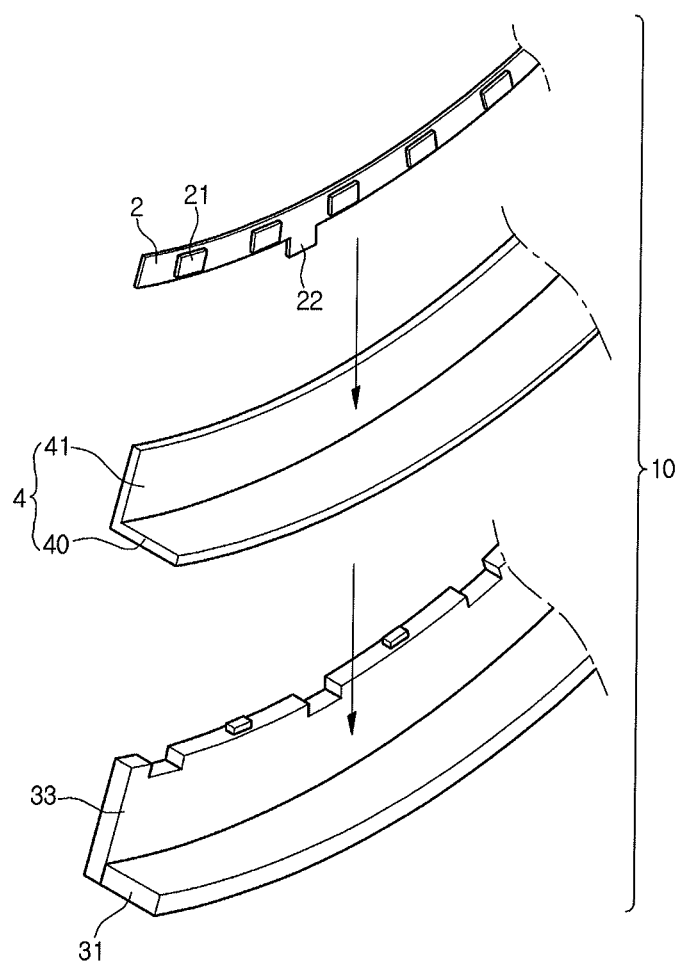
FIG. 17A is a disassembled perspective view showing a reinforcement frame, a housing and a horizontal light source substrate according to a second embodiment of the present disclosure.

FIG. 17A a disassembled perspective view partially showing a reinforcement frame, a housing and a light source substrate according to a second embodiment of the present disclosure. The components of the second embodiment having the same function and shape as those of the first embodiment will be referred to by the same reference numbers and names. Also, the description of the second embodiment overlapping with the first embodiment will be omitted.

Referring to FIG. 17A, the backlight assembly 10 of the second embodiment can further include a housing 4 in comparison with that of the first embodiment having the reinforcement frame 3 and the light source substrate 2. The housing 4 can include a bottom portion 40 and a side wall portion 41 which extends vertically from a side edge of the bottom portion 40 in an upward direction. The bottom portion 40 of the housing 4 can be formed to have the same curvature as the horizontal reinforcement bar 31 of the reinforcement frame 3. The side wall portion 41 of the housing 4 can be formed to have the same curvature as the edge reinforcement bar 33 of the reinforcement frame 3. However, the bottom portion 40 and the side wall portion 41 forming the housing 4 are not limited to these.

Figure 17B:
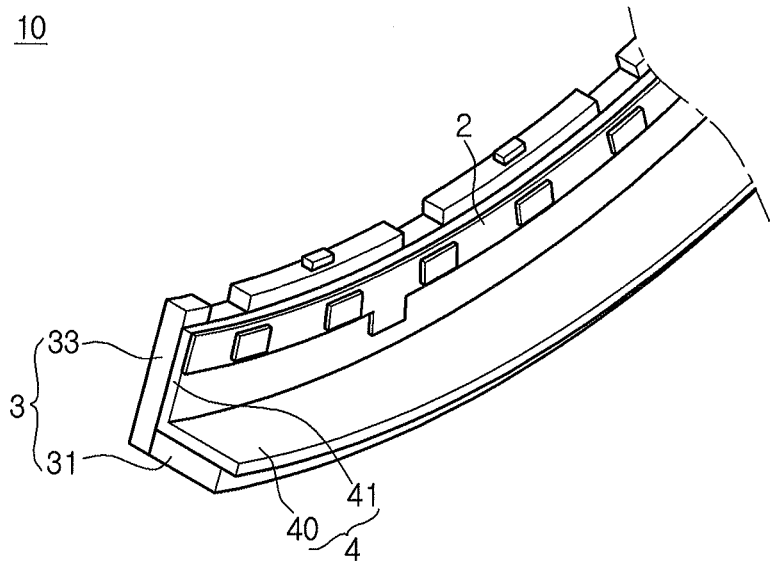
FIG. 17B is a perspective view illustrating a combination state of the reinforcement frame, the housing and the light source substrate according to a second embodiment of the present disclosure.

FIG. 17B is a perspective view illustrating an assembled state of the reinforcement frame, the housing and the light source substrate according to the second embodiment of the present disclosure. As shown in FIG. 5B, the bottom portion 40 of the housing 4 is disposed on the horizontal reinforcement bar 31. The side wall portion 41 of the housing 4 is disposed on the inner surface of the edge reinforcement bar 33 of the reinforcement frame 3. The light source substrate 2 is disposed on the inner surface of the side wall portion 41 of the housing 4.

The side wall portion 41 of the housing 4 can be attached to the edge reinforcement bar 33 by at least one screw. The light source substrate 2 can be fastened to the inner surface of the side wall portion 41 of the housing 4 by an adhesive member which is attached to the entire rear surface of the light source substrate 2. However, the methods of combining the side wall portion 41 of the housing 4 and the edge reinforcement bar 33 and fastening the light source substrate 2 to the side wall portion 41 of the housing 4 may not be limited to use of the adhesive member.

The housing 4 can transfer heat generated in the light source substrate 2 to the exterior. Also, the housing 4 can be used to reflect light generated in the light source substrate 2. In this embodiment, the side wall portion 41 of the housing 4 can be formed to have lower height and smaller thickness than those of the edge reinforcement bar 33, but it is not limited thereto. The bottom portion 40 of the housing 4 is formed to have a wider area than that of the horizontal reinforcement bar 31, but it is not limited to this.

The housing 4 is disposed at an edge of the reinforcement frame 3 as shown in the drawings, but it is not limited to this. Alternatively, the housing 4 loaded with the light source substrate 2 can be disposed in any one of both the edge reinforcement bars 33 which are positioned at both the edges of the reinforcement frame 3 opposite to each other. Furthermore, the housing 4 loaded with the light source substrate 2 is disposed in both the edge reinforcement bars 33 which are positioned at both the edges of the reinforcement frame 3 opposite to each other.

Figure 18A:
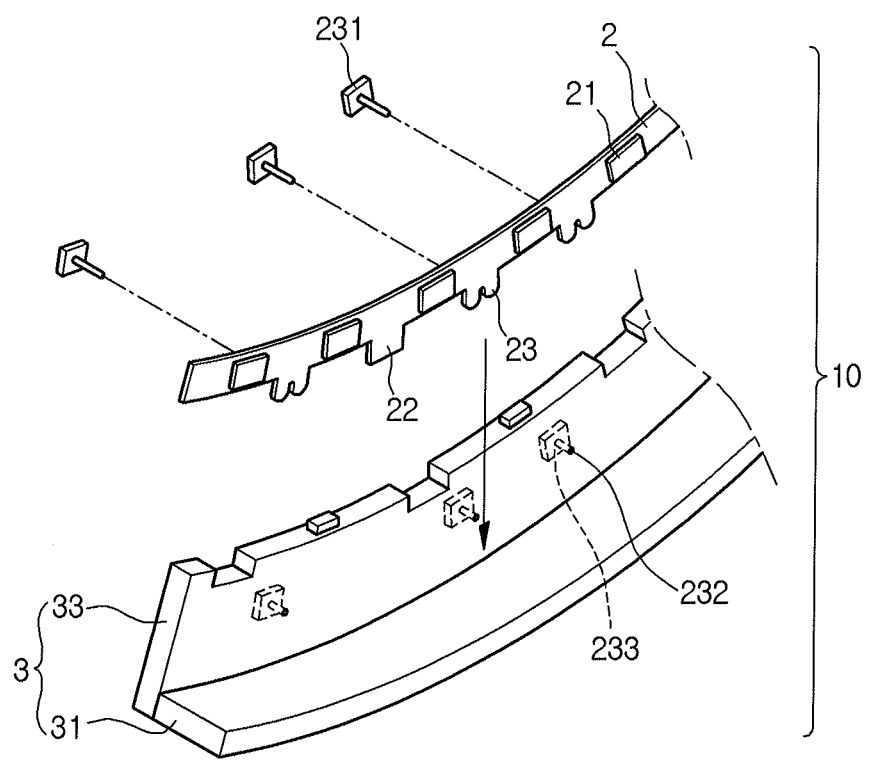
FIG. 18A is a disassembled perspective view showing a reinforcement frame and a horizontal light source substrate according to a third embodiment of the present disclosure.

FIG. 18A is a disassembled perspective view showing a reinforcement frame and a light source substrate according to a third embodiment of the present disclosure. The components of the third embodiment having the same function and shape as those of the first embodiment will be referred to by the same reference numbers and names. Also, the description of the third embodiment overlapping with the first embodiment will be omitted. Referring to FIG. 18A, a backlight assembly 10 according to the third embodiment of the present disclosure includes a light source substrate 2 and a reinforcement frame 3. An edge reinforcement bar 33 of the reinforcement frame 3 can include pins 231 which are used to fix the light source substrate 2, but it is not limited to this. In other words, at least two pins 231 can be arranged in the edge reinforcement bar 33.

Holes 232 and concave (or recessed) portions 233 can be formed in the edge reinforcement bar 33. Each of the holes 233 can be formed in the center of the concave portion 233 and penetrated by a needle of the pin 231. The pins 231 each include an enlarged pin head received in the concave portion 233 and the needle. Alternatively, the pins 231 can be formed in a single body united with the edge reinforcement bar 33. However, the edge reinforcement bar 33 and the pins 231 are not limited to these.

The light source substrate 2 can be loaded with at least one light source 21 and a connector 22. The light source substrate 2 can be formed to have a body portion and at least two fixation tabs 23 which protrude downwardly from an edge (i.e., a bottom edge) of the body portion of the light source substrate 2. The body portion of the light source substrate 2 can be formed to have the same curvature as the edge reinforcement bar 33. The at least one light source 21 can include a plurality of light sources which are arranged on the body portion of the light source substrate 2 in such a manner as to be separated from one another. The connector can be disposed on a protrusion positioned between the fixation tabs 23, but it is not limited to this. Each of the fixation tabs 23 protruding from the bottom edge of the body portion of the light source substrate 2 can be formed in a hook shape with a recess which is formed at a position opposite to the pin 231. Therefore, the light source substrate 2 can be attached to the edge reinforcement bar 33 by inserting the needles of the pins 231 into the recess of the fixation tabs 23. The light source substrate 2 and the pins 231 can be formed from a metal material such as aluminum (Al), iron (Fe) or others. The pins 231 can be formed from the same material as the edge reinforcement bar 33, but it is not limited to this.

Figure 18B:
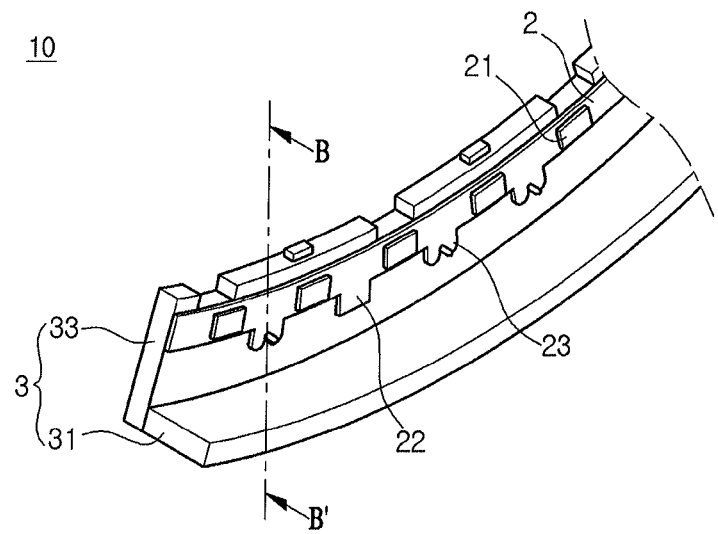
FIG. 18B is a perspective view illustrating a combination state of the reinforcement frame and the horizontal light source substrate according to a third embodiment of the present disclosure.

FIG. 18B is a perspective view partially showing an assembled state of the reinforcement frame and the light source substrate according to a third embodiment of the present disclosure. As shown in FIG. 18B, the fixation tabs 23 are locked with the needles of the pins 231 which are formed in or penetrate through the edge reinforcement bar 33. In accordance therewith, the light source substrate 2 can be fastened to the edge reinforcement bar 33. The light source substrate 2 can be disposed only on one of the edge reinforcement bars 33 which are positioned at both the edges of the reinforcement frame 3. Alternatively, the light source substrate 2 can be disposed on the edge reinforcement bars 33 which are positioned at both edges of the reinforcement frame 3.

In this manner, the light source substrate 2 can be disposed at an edge reinforcement bar 33. As such, at least one of the top and bottom edges of the backlight assembly 10 can be included in a display area. Therefore, a narrow bezel can be realized, and furthermore the left and right rims of the back of a display device including the backlight assembly 10 of the present embodiment hardly appear. As a result, a display device using the backlight assembly of the present embodiment can increase sense of involvement.

Figure 19A:
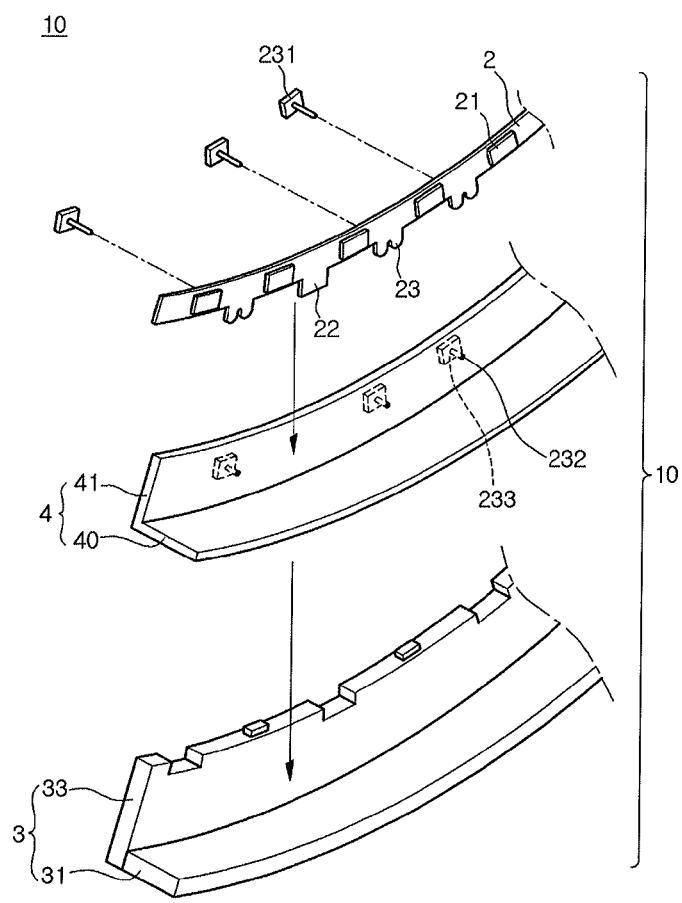
FIG. 19A is a disassembled perspective view showing a reinforcement frame, a housing and a light source substrate according to a fourth embodiment of the present disclosure.

FIG. 19A is a disassembled perspective view showing a reinforcement frame, a housing and a light source substrate according to a fourth embodiment of the present disclosure. The components of the fourth embodiment having the same function and shape as those of the second and third embodiments will be referred to by the same reference numbers and names. Also, the description of the fourth embodiment overlapping with the second and third embodiments will be omitted.

Referring to FIG. 19A, the backlight unit 10 according to the fourth embodiment can include a reinforcement frame 3, a housing 4 and a light source substrate 2. The housing 4 includes at least two pins 231 which are used to fasten the light source substrate 2, but it is not limited to this. The pins 231 are arranged on the inner surface of the side wall portion 41 of the housing 4 in such a manner as to be spaced from each other. Holes 232 and concave portions 233 can be formed in the outer surface of the side wall portion 41 of the housing 4. Each of the holes 233 can be formed in the center of the concave portion 233 and penetrated by a needle of the pin 231. Each of the concave portions 233 can be used to receive a head of the pin 231. Alternatively, the pins 231 can be integrally formed with the side wall portion 41 of the housing 4. However, various other constructions of the housing 4 and the pins 231 are available.

Figure 19B:
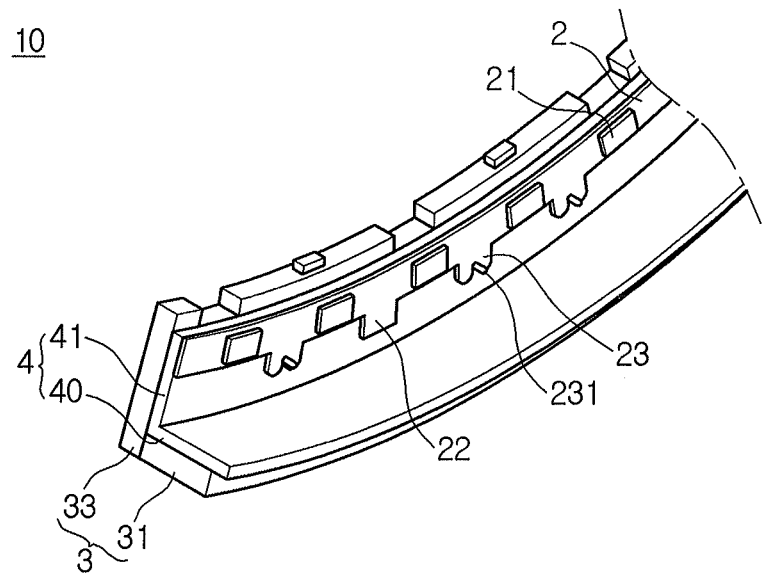
FIG. 19B is a perspective view illustrating a combination state of the reinforcement frame, the housing and the light source substrate according to a fourth embodiment of the present disclosure.

FIG. 19B is a perspective view illustrating an assembled state of the reinforcement frame, the housing 4 and the light source substrate 2 which are shown in FIG. 19A. As shown in FIG. 19B, the bottom portion 40 of the housing 4 is disposed on the horizontal reinforcement bar 31 of the reinforcement frame 3. The side wall portion 41 of the housing 4 is disposed on the inner surface of the edge reinforcement bar 33 of the reinforcement frame 3. The light source substrate 2 is disposed on the inner surface of the side wall portion 41 of the housing 4. The fixation tabs 23 of the light source substrate 2 are locked with the needles of the pins 231 which are formed in or penetrate through the side wall portion 41 of the housing 4. Therefore, the light source substrate 2 can be fastened to the housing 4.

The housing 4 loaded with the light source substrate 2 can be disposed in any one of the edge reinforcement bars 33 which are positioned at both edges of the reinforcement frame 3 opposite to each other. Alternatively, the housing 4 loaded with the light source substrate 2 can be disposed in both the edge reinforcement bars 33 which are positioned at both the edges of reinforcement frame 3 opposite to each other.

Figure 20:
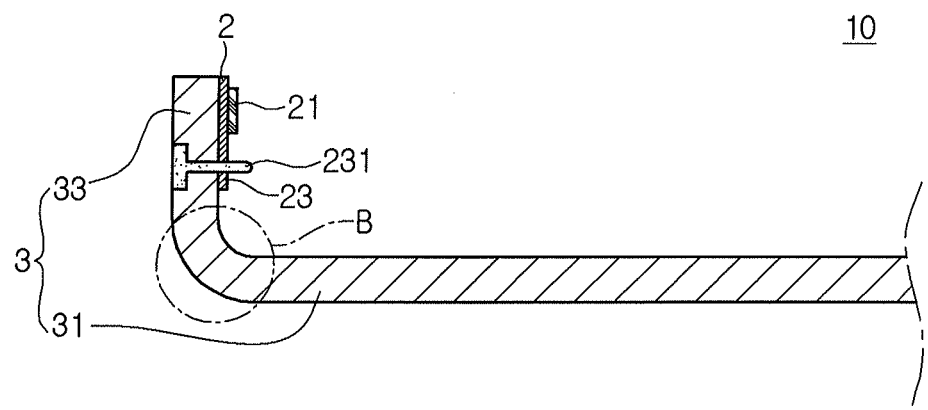
FIG. 20 is a cross-sectional view showing the reinforcement frame and the light source substrate taken along a line B-B' in FIG. 18B.

FIG. 20 is a cross-sectional view showing the edge reinforcement bar and the light source substrate taken along a line B-B' in FIG. 18B. Although the edge reinforcement bar 33 and the horizontal reinforcement bar 31 of the reinforcement frame 3 can be formed in such a manner as to be separated from each other, they can be integrally formed in a single body as shown in FIG. 8. In this case, the reinforcement frame 3 can be formed through one of an extrusion molding process and a roll forming process, but it is not limited to this. When the reinforcement frame 3 is formed through the roll forming process, the reinforcement frame 3 can be formed in a thin and long shape. Also, the connection portion (or the boundary portion) of the edge reinforcement bar 33 and the horizontal reinforcement bar perpendicular to each other 31 can be formed in a rounded shape, as a portion of "B" in FIG. 20, not a right-angled shape.

If the connection portion is formed in the right-angled shape unlike the portion of "B" in FIG. 20, an edge (i.e., the bottom edge) of the light source substrate 2 can be in contact with the horizontal reinforcement bar 31 and the rear surface of the light source substrate can be in contact with the inner surface of the edge reinforcement bar 33. As such, the light source substrate 2 is stably disposed in or fastened to the reinforcement frame 3. On the contrary, when the connection portion of the edge reinforcement bar 33 and the horizontal reinforcement bar 31 is formed in the rounded shape as a portion of "B" in FIG. 20, it is difficult to stably dispose the light source substrate 2 in the reinforcement frame 3 because an edge (the bottom edge) of the light source substrate 2 comes in contact with the rounded surface of the reinforcement frame 3. To address this matter, an adhesive member (not shown) between the inner surface of the edge reinforcement bar 33 of the reinforcement frame 3 and the rear surface of the light source substrate 2, or provide at least two pins 231 at desired positions in the edge reinforcement bar 33 of the reinforcement frame 3. As such, the light source substrate 2 can be stably fastened to the inner surface of the edge reinforcement bar 33 and misalignment between the light source substrate 2 and the edge reinforcement bar 33 can be prevented. In accordance therewith, a brightness problem caused by a light shortage due to the misalignment between the light source substrate 2 and the edge reinforcement bar 33 can be prevented.

Although it is explained that the edge reinforcement 33 of the reinforcement frame 3 is provided with the pins 231 in FIG. 8, it is not limited to this. If the pins 231 are provided to the housing 4 as shown in FIG. 7A, the structure of the reinforcement frame 3 of FIG. 8 can be applied to the housing 4 in the same manner.

Figure 21A:
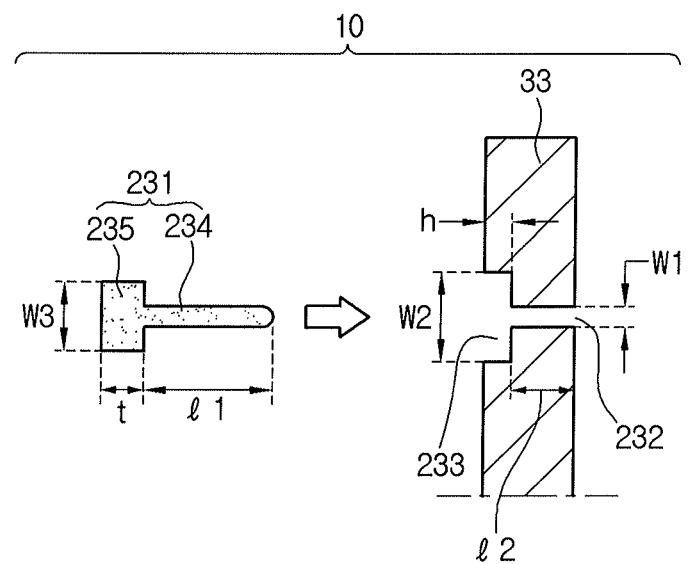
Figure 21B:
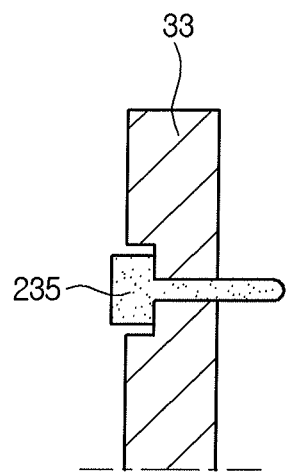
Figure 21C:
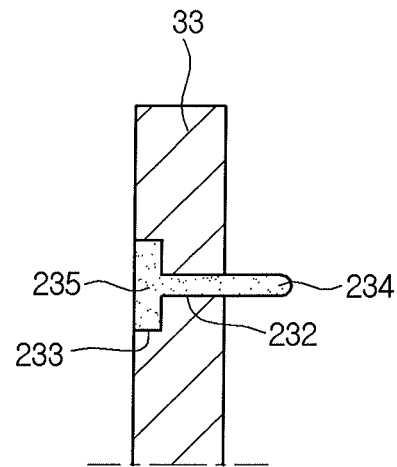

FIGS. 21A through 21C are cross-sectional views illustrating a combination process of the edge reinforcement bar and a pin. Referring to FIG. 21A, the edge reinforcement bar 33 can be formed to have a hole 232 and a concave portion 233 formed at a position corresponding to the hole 232. The concave portion 233 can be formed to have a larger width W2 than the width W1 of the hole 232. The pin 231 can include a needle 234 and a head 235. The needle 234 can be formed to have a longer length l1 than a depth l2 of the hole 232. The head 235 can be formed to have a thicker thickness t than a depth h of the concave portion 233 and a wider width W3 than a width W2 of the concave portion 233, but it is not limited to this.

As shown in FIG. 21B, the needle 234 can penetrate through the hole 232 and allow its end portion to be exposed to the inside space of the edge reinforcement bar 33, when the pin 231 is attached to the edge reinforcement bar 33. Also, the head 235 can be received into the concave portion 233. In accordance therewith, the pin 231 can be fastened to the edge reinforcement bar 33.

The head 235 is crushed by an impact, which is applied toward the concave portion 233, and comes in close contact with the inner surfaces of the concave portion 233. As such, the exposed surface of the impacted head 235 can be in the same level with the outer surface of the edge reinforcement bar 33, but it is not limited to this. The needle 235 can be formed in one of a square pillar, a cylinder and so on, but it is not limited to this. The hole 232 can be formed in a shape opposite to the that of the needle 234. Also, the head 235 can be formed in one of a hexahedron, a hemisphere and so on, but it is not limited to this. The concave portion 233 can be formed a shape opposite to that of the head 235.

The combination of the edge reinforcement bar 33 and the pin 231 is explained as shown in FIGS. 21A through 21C. If the pin 231 is attached to the housing 4 as shown in FIG. 21A, the combination of the edge reinforcement bar 33 and the pin 231 illustrated in FIGS. 21A through 21C can be applied to the combination of the housing 4 and the pin 231 in the same manner and process.

Figure 22A:
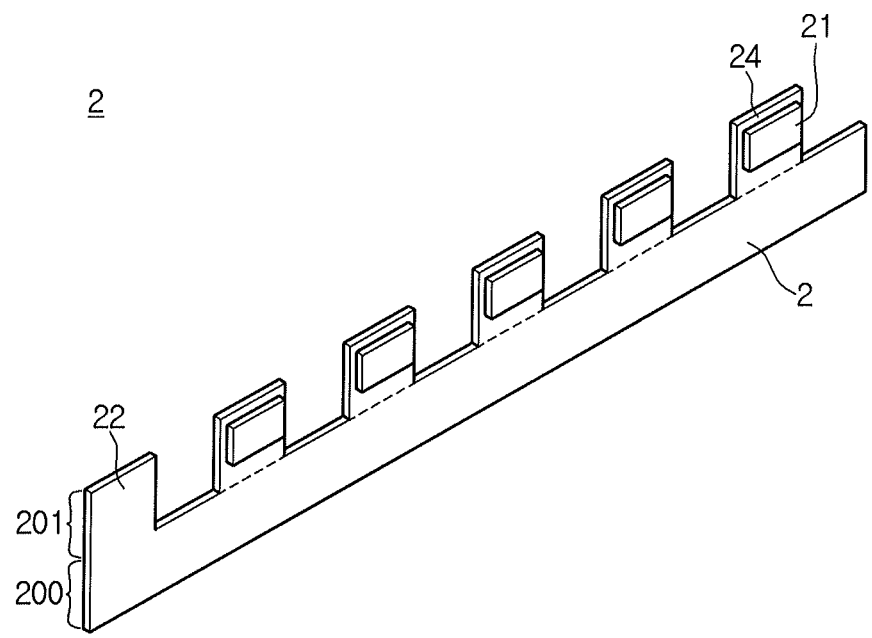
FIGS. 22A through 22C are perspective view illustrating a formation process of a light source substrate according to a fifth embodiment of the present disclosure.
Figure 22B:
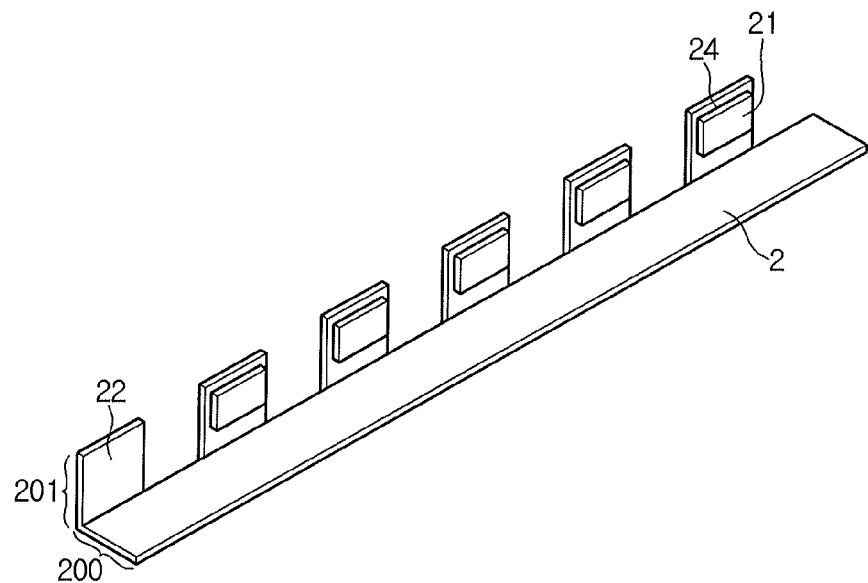
Figure 22C:
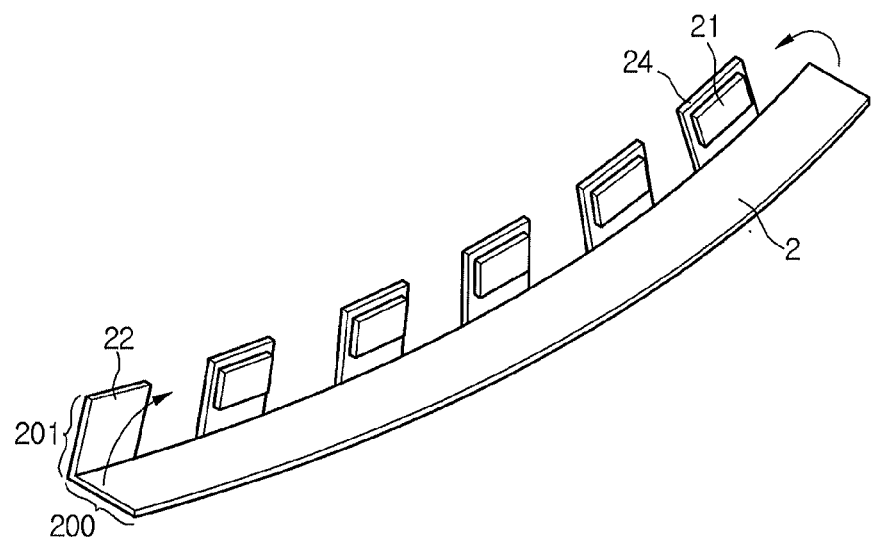

FIGS. 22A through 22C are perspective view illustrating a formation process of a light source substrate according to a fifth embodiment of the present disclosure. The components of the fifth embodiment having the same function and shape as those of the first through fourth embodiments will be referred to by the same reference numbers and names. Also, the description of the fifth embodiment overlapping with the first through fourth embodiments will be omitted.

Referring to FIGS. 22A through 22C, a light source substrate 320 can be formed to have a body portion, which is formed in a bar shape, and at least two wings 324 which protrude outwardly from an edge of the body portion and are separated from each other. The connector 322 is disposed on one of the wings 324, and the light sources 321 are disposed on the other wings 324. However, the light source substrate 320 is not limited to this. Each of the wings 324 can be formed in one of a tetragonal shape and a trapezoid shape, but various other shapes are available.

More specifically, the light source substrate 320 includes a bottom portion 200 and a side wall portion 201. The bottom portion 200 can correspond to the body portion. The side wall portion 201 can include the wings 324 on which the connector 322 and the light source 321 are disposed respectively. The side wall portion 201 can be bent perpendicularly to the bottom portion 200, as shown in FIG. 22B. The bottom portion 200 can be curved along arrow directions in a fixed curvature, as shown in FIG. 22C. In this case, the side wall portion 201 is also curved in the same curvature as the bottom portion 200. As such, the light sources 320 on the wings 324 can be arranged in desired incident light directions. In accordance therewith, a light efficiency can be enhanced.

Unlike a curved light source substrate which is derived and separated from an original substrate, a light source substrate 320 of a bar shape with wings, which is separated from an original substrate and bent and curved as shown in FIGS. 22B and 22C, can enhance use-efficiency of the original substrate. As such, manufacturing costs of the backlight assembly can be reduced.

Figure 23A:
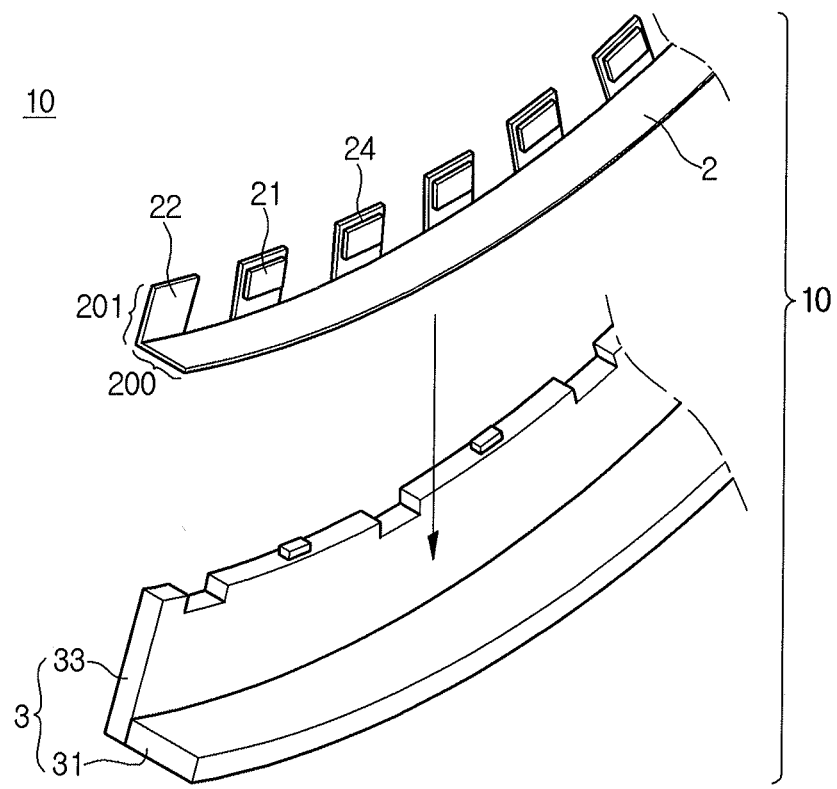
FIG. 23A is a disassembled perspective view showing a reinforcement frame and a light source substrate according to the fifth embodiment of the present disclosure.
Figure 23B:
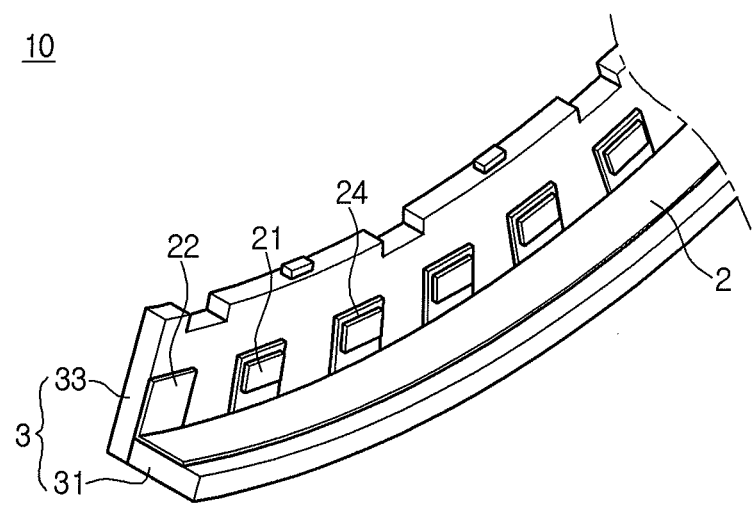
FIG. 23B is a perspective view illustrating a combination state of the reinforcement frame and the light source substrate according to the fifth embodiment of the present disclosure.

FIG. 23A is a disassembled perspective view showing an edge reinforcement bar and a light source substrate according to a fifth embodiment of the present disclosure. FIG. 23B is a perspective view illustrating a combination state of the edge reinforcement bar and the light source substrate according to a fifth embodiment of the present disclosure.

Referring to FIGS. 23A and 23B, the bottom portion 200 of the light source substrate 2 is disposed on the horizontal reinforcement bar 31 of the reinforcement frame 3. The side wall portion 201 of the light source substrate 2 is disposed on the inner surface of the edge reinforcement bar 33 of the reinforcement frame 3. The bottom portion 200 of the light source substrate 2 has a curvature corresponding to that of the horizontal reinforcement bar 31.

The light source substrate 320 can be an elastic and flexible substrate. The bottom portion 200 of the light source substrate 320 can be curved along size and curvature of the reinforcement frame 3. The wings 324 included in the side wall portion 201 of the light source substrate 320 are arranged in such a manner as to be separated from each other. As such, the side wall portion 201 of the light source substrate 2 can also be curved and disposed on the edge reinforcement bar 33 when the bottom portion 200 of the light source substrate 320 is curved. The light source substrate 320 can be formed from a metal material such as aluminum (Al), iron (Fe) or others. Alternatively, the light source substrate 320 can become a flexible film. Various other constructions of the light source substrate 320 are available. Also, the reinforcement frame 3 and the light source substrate 320 can be attached to each other by means of one of an adhesive member and a screw, but it is not limited to this.

Figure 24A:
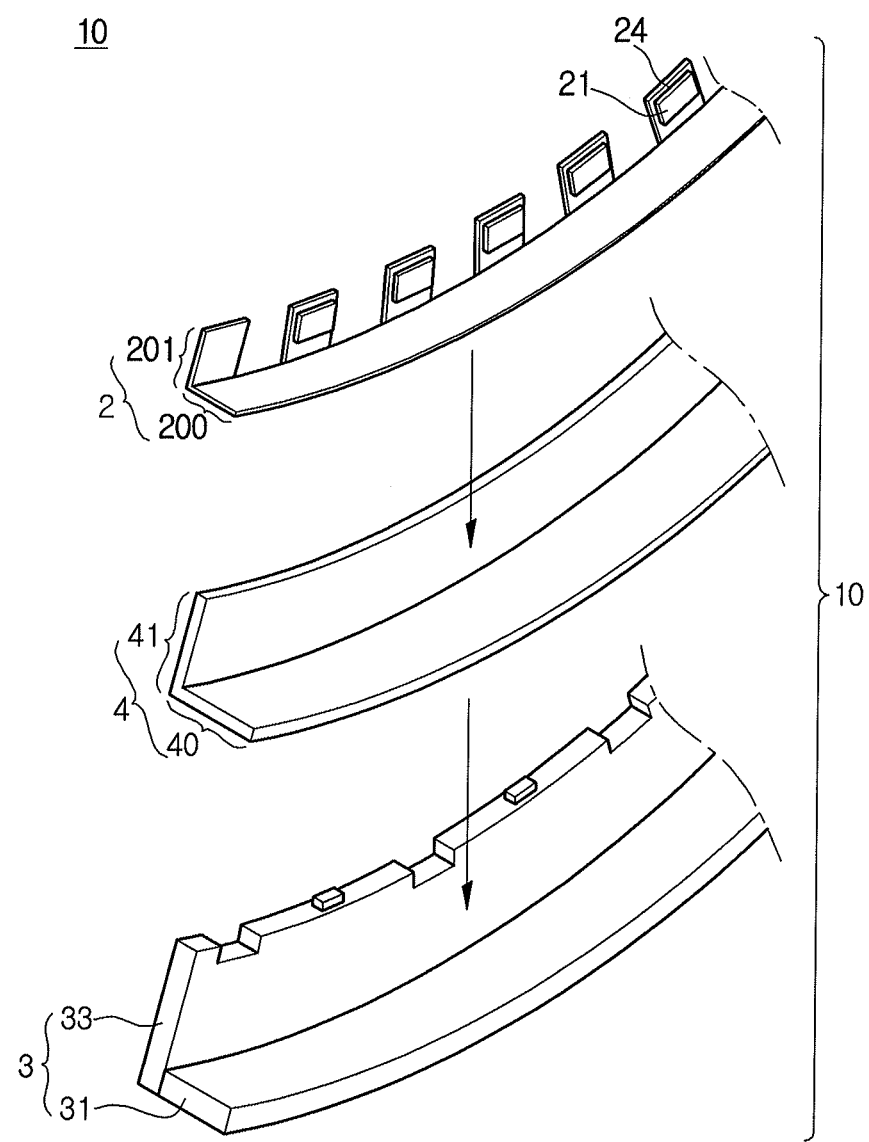
FIG. 24A is a disassembled perspective view showing a reinforcement frame, a housing and a light source substrate according to a sixth embodiment of the present disclosure.
Figure 24B:
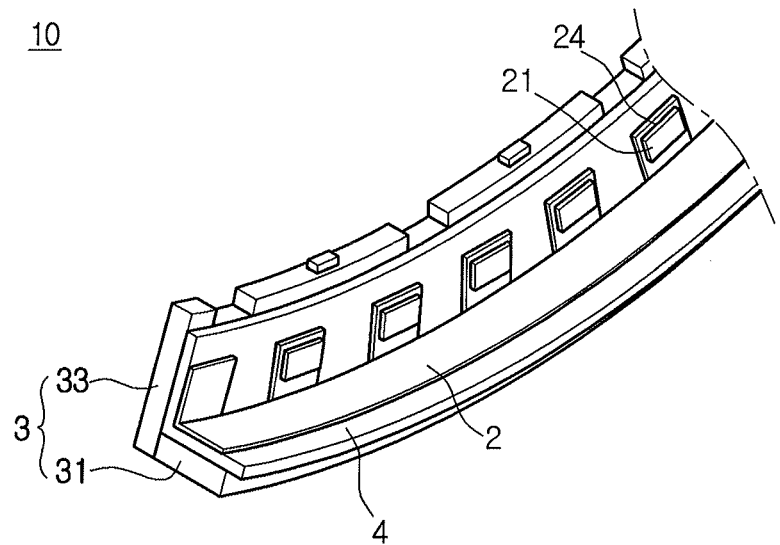
FIG. 24B is a perspective view illustrating a combination state of the reinforcement frame, the housing and the light source substrate according to the sixth embodiment of the present disclosure.

FIG. 24A is a disassembled perspective view showing a reinforcement frame, a housing and a light source substrate according to a sixth embodiment of the present disclosure. FIG. 24B is a perspective view illustrating a combination state of the reinforcement frame, the housing and the light source substrate according to the sixth embodiment of the present disclosure. The components of the sixth embodiment having the same function and shape as those of the fifth embodiment will be referred to by the same reference numbers and names. Also, the description of the sixth embodiment overlapping with the fifth embodiment will be omitted Referring to FIGS. 24A and 24B, the backlight assembly 10 according to the sixth embodiment includes a reinforcement frame 3, a housing 4 and a light source substrate 2. The bottom portion 40 of the housing 4 can be disposed on a horizontal reinforcement bar 31 of the reinforcement frame 3, and the side wall portion of the housing 4 can be disposed on the inner surface of the edge reinforcement bar 33 of the reinforcement frame 3. The bottom portion 200 of the light source substrate 2 can be disposed on the bottom portion 40 of the housing 4, and the side wall portion 201 of the light source substrate 2 can be disposed on the inner surface of the side wall portion 41 of the housing 4. The horizontal reinforcement bar 31 of the reinforcement frame 3, the bottom portion 41 of the housing 4 and the bottom portion 200 of the light source substrate 2 can have the same curvature, but it is not limited to this.

The edge reinforcement bar 33 of the reinforcement frame 3 can be attached to the side wall portion 41 of the housing 4 by at least one screw. The light source substrate 2 and the housing 4 can be attached to each other by an adhesive member attached between the side wall portion 201 of the light source substrate 320 and the side wall portion 41 of the housing 4. However, the combination of the edge reinforcement frame 3, the housing 4 and the light source substrate 320 is not limited to this. Although it is not shown in the drawings, the housing 4 loaded with the light source substrate 320 can be disposed in any one of the edge reinforcement bars 33 which are positioned at both edges of the reinforcement frame 3 opposite to each other. Alternatively, the housing 4 loaded with the light source substrate 320 can be disposed in both the edge reinforcement bars 33 which are positioned at both the edges of reinforcement frame 3 opposite to each other.

Figure 25:
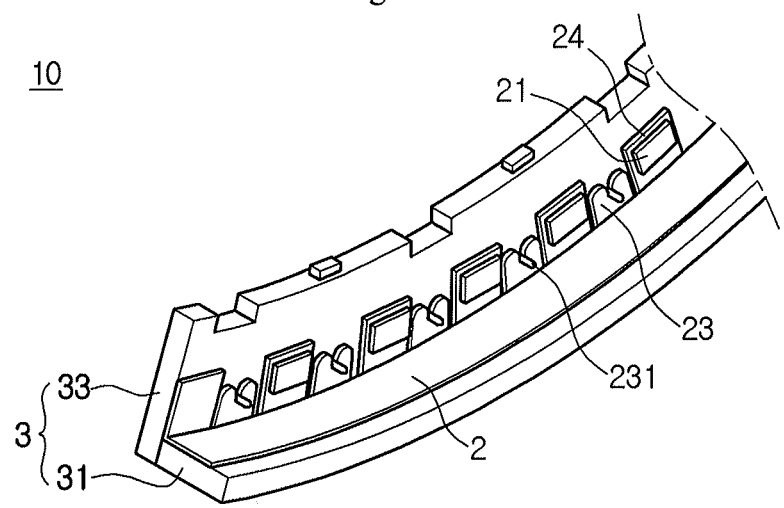
FIG. 25 is a perspective view showing a reinforcement frame and a light source substrate according to a seventh embodiment of the present disclosure.

FIG. 25 is a perspective view showing a reinforcement frame and a light source substrate according to a seventh embodiment of the present disclosure. The components of the seventh embodiment having the same function and shape as those of the first through sixth embodiments will be referred to by the same reference numbers and names. Also, the description of the seventh embodiment overlapping with the first through sixth embodiments will be omitted.

Referring to FIG. 25, fixation tabs 23 can be disposed between the wings 24 of the light source substrate 2. Also, pins 231 can be arranged at positions of the edge reinforcement bar 33 of the reinforcement frame 3 opposite to the fixation tabs 23. The fixation tabs 23 are locked with the needles of the pins 231 so that the light source substrate 2 can be stably fastened to the reinforcement frame 3.

Although it is not shown in the drawings, the light source substrate 2 can be disposed in both the edge reinforcement bars 33 which are positioned at both edges of the reinforcement frame 3 opposite to each other. Alternatively, the light source substrate 2 can be disposed in any one of the edge reinforcement bars 33 which are positioned at both the edges of reinforcement frame 3 opposite to each other.

Figure 26:
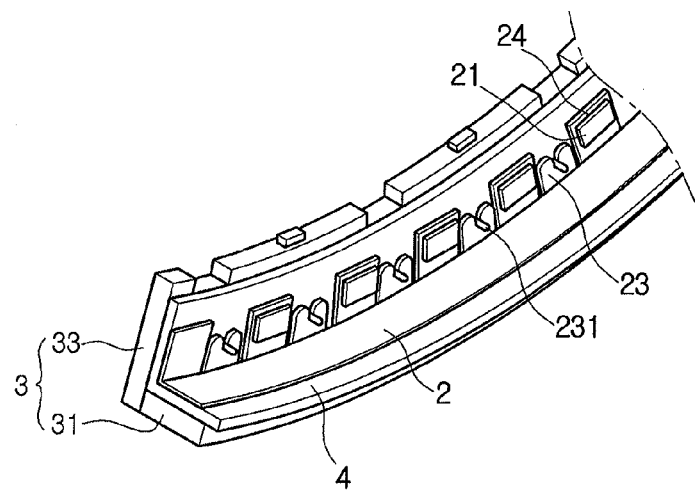
FIG. 26 is a perspective view showing a reinforcement frame, a housing and a light source substrate according to an eighth embodiment of the present disclosure.

FIG. 26 is a perspective view showing a reinforcement frame, a housing and a light source substrate according to an eighth embodiment of the present disclosure. The components of the eighth embodiment having the same function and shape as those of the seventh embodiment will be referred to by the same reference numbers and names. Also, the description of the eighth embodiment overlapping with the seventh embodiment will be omitted.

Referring to FIG. 26, the fixation tabs 23 can be disposed between the wings 324 of the light source substrate 320. Also, pins 231 can be arranged at positions of the side wall portion 41 of the housing 4 opposite to the fixation tabs 23. The fixation tabs 23 are locked with the needles of the pins 231 so that the light source substrate 320 can be stably fastened to the housing 4.

Although it is not shown in the drawing, the housing 4 loaded with the light source substrate 2 can be disposed in both the edge reinforcement bars 33 which are positioned at both edges of the reinforcement frame 3 opposite to each other. Alternatively, the housing 4 loaded with the light source substrate 320 can be disposed in any one of the edge reinforcement bars 33 which are positioned at both the edges of reinforcement frame 3 opposite to each other.

As described above, the backlight assemblies according to the above-described embodiments of the present disclosure can realize a narrow bezel by disposing the curved light source substrate 320 in the inner side surface of the reinforcement frame 3. Also, the backlight assemblies of the above-described embodiments can prevent misalignment between the light source substrate and the reinforcement frame by enabling the fixation tabs of the light source substrate to be locked with the pins which are arranged on the reinforcement frame. Moreover, the backlight assemblies can allow the flexible light source substrate to be curved along the size and curvature of the reinforcement frame. As such, the light source substrate can be stably disposed on the inner side surface of the reinforcement frame.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

The invention claimed is:

1. A curved liquid crystal display device comprising:
   a liquid crystal display panel including a thin film transistor substrate and a color filter substrate;
   a backlight unit applying light to the liquid crystal display panel;
   a bottom cover supporting the backlight unit and having a flat shape; and
   a reinforcement frame having a predetermined curvature and attached to the bottom cover, wherein the reinforcement frame includes a plurality of horizontal reinforcement bars and a plurality of vertical reinforcement bars crossing the plurality of horizontal reinforcement bars, the plurality of horizontal and vertical reinforcement bars having upper surfaces in contact with a bottom surface of the bottom cover;
   wherein the flat bottom cover is mounted on the reinforcement frame such that the flat bottom cover has the predetermined curvature of the reinforcement frame.

2. The liquid crystal display device of claim 1, further comprising a top case that protects edges of a front surface of the liquid crystal display panel and that has the same curvature as the reinforcement frame.

3. The liquid crystal display device of claim 1, wherein the reinforcement frame further comprises
   an edge reinforcement bar extending perpendicularly from an upper surface of an outermost horizontal reinforcement bar for abutting against side surfaces of the bottom cover.

4. The liquid crystal display device of claim 3, wherein the vertical reinforcement bar includes:
   a main body portion; and
   at least one recessed portion formed in a region where a vertical reinforcement bar crosses a horizontal reinforcement bar.

5. The liquid crystal display device of claim 4, wherein the horizontal reinforcement bar is received in the recessed portion and fastened to the vertical reinforcement bar.

6. The liquid crystal display device of claim 3, wherein the backlight unit includes:
   a light source configured to emit light;
   a light guide plate disposed adjacent the light source and configured to convert light from the light source into two-dimensional light;
   an optical sheet disposed on an upper surface of the light guide plate and configured to scatter and converge light from the light guide plate; and
   a housing configured to protect the light source, and
   wherein the light guide plate, the optical sheet and the housing are fastened to the reinforcement frame.

7. The liquid crystal display device of claim 6, wherein the edge reinforcement bar includes:
   a side wall with a top edge;
   a plurality of side protrusions protruding upwardly from the top edge of the side wall; and
   a plurality of side concaves recessed from the top edge of the side wall.

8. The liquid crystal display device of claim 7, wherein the optical sheet includes a plurality of edge tabs protruding outwardly from edges of the optical sheet and attached to the plurality of side protrusions of the edge reinforcement bar.

9. The liquid crystal display device of claim 7, further comprising a plurality of engagement member disposed in the side concaves of the edge reinforcement bar and fastening the light guide plate to the bottom cover.

10. The liquid crystal display device of claim 9, further comprising a plurality of cover protrusions protruding upwardly from an upper surface of the bottom cover, wherein the engagement members are attached to the cover protrusions.

11. The liquid crystal display device of claim 9, wherein an engagement member is formed in an L shape.

12. The liquid crystal display device of claim 6, wherein the bottom cover includes:
a body portion;
wings expending outwardly from both side edges of the body portion, the wings and the body portion being formed at different elevations to define a step therebetween; and
receiving grooves formed in the wings to expose ends of the horizontal reinforcement bars.

13. The liquid crystal display device of claim 12, wherein a lower surface of the housing is formed opposite to the wing and the horizontal reinforcement bar and fastened to the bottom cover and the reinforcement frame.

14. The liquid crystal display device of claim 1, wherein the vertical reinforcement bars each define at least one recessed portion recessed from the upper surface of the vertical reinforcement bar to allow the horizontal reinforcement bar to pass through, the recessed portion facing the bottom cover.

15. A curved liquid crystal display device, comprising:
a curved reinforcement frame comprising a plurality of horizontal reinforcement bars having a predetermined curvature and a plurality of vertical reinforcement bars crossing the plurality of horizontal reinforcement bars;
a flat bottom cover mounted on the curved reinforcement frame such that the flat bottom cover is configured to be curved with the reinforcement frame, the plurality of horizontal and vertical reinforcement bars having upper surfaces in contact with a bottom surface of the bottom cover;
a light guide plate mounted on the bottom cover such that the light guide plate is curved with the reinforcement frame;
an engagement member securing the light guide plate on the bottom cover and the reinforcement frame;
an optical sheet arranged on the light guide plate and secured on an edge of the reinforcement frame, the optical sheet configured to be curved with the bottom cover and the reinforcement frame; and
a liquid crystal panel mounted on the optical sheet.

16. The device of claim 15, further comprising:
a backlight arranged vertically along at least one of left or right side of the liquid crystal panel.

17. The device of claim 16, wherein the engagement member is arranged horizontally along at least one of upper or lower side of the liquid crystal panel to secure light path between the backlight and the light guide plate.

18. The device of claim 15, further comprising:
a backlight horizontally along at least one of an upper or a lower side of the liquid crystal panel.

19. The device of claim 15, wherein the optical sheet is secured at a location between neighboring engagement members on the edge of the reinforcement frame.

* * * * *